(12) United States Patent
Babinec et al.

(10) Patent No.: US 9,056,944 B2
(45) Date of Patent: Jun. 16, 2015

(54) DUCTILE POLYMER BINDERS AND BATTERY COMPONENTS USING THE SAME

(75) Inventors: Susan J. Babinec, Midland, MI (US); Houxiang Tang, Midland, MI (US); Abhijit Ghosh-Dastidar, East Brunswick, NJ (US); Eric P. Wasserman, Hopewell, NJ (US); Richard A. Galley, Belle Mead, NJ (US); Michael M. Luong, Edison, NJ (US)

(73) Assignee: Dow Global Technologies LLC, Midland, MI (US)

( * ) Notice: Subject to any disclaimer, the term of this patent is extended or adjusted under 35 U.S.C. 154(b) by 847 days.

(21) Appl. No.: 13/201,069

(22) PCT Filed: Feb. 10, 2010

(86) PCT No.: PCT/US2010/023737
§ 371 (c)(1),
(2), (4) Date: Aug. 11, 2011

(87) PCT Pub. No.: WO2010/093681
PCT Pub. Date: Aug. 19, 2010

(65) Prior Publication Data
US 2011/0318646 A1 Dec. 29, 2011

Related U.S. Application Data

(60) Provisional application No. 61/151,739, filed on Feb. 11, 2009.

(51) Int. Cl.
| | | |
|---|---|---|
| *C08G 65/12* | (2006.01) | |
| *C08G 65/26* | (2006.01) | |
| *C08G 65/331* | (2006.01) | |
| *H01M 4/62* | (2006.01) | |
| *H01M 10/052* | (2010.01) | |
| *H01M 10/0565* | (2010.01) | |
| *H01M 4/02* | (2006.01) | |

(52) U.S. Cl.
CPC ........ *C08G 65/2654* (2013.01); *C08G 65/2657* (2013.01); *C08G 65/3312* (2013.01); *C08G 2650/58* (2013.01); *C08L 2205/05* (2013.01); *H01M 4/621* (2013.01); *H01M 4/622* (2013.01); *H01M 10/052* (2013.01); *H01M 10/0565* (2013.01); *H01M 2004/021* (2013.01); *Y02E 60/122* (2013.01)

(58) Field of Classification Search
CPC ........................ C08G 65/2654; C08G 65/2657
USPC ........................................................ 524/430
See application file for complete search history.

(56) References Cited

U.S. PATENT DOCUMENTS

| | | | |
|---|---|---|---|
| 3,644,224 | A | 2/1972 | Hani et al. |
| 4,303,748 | A | 12/1981 | Armand et al. |
| 6,174,623 | B1 | 1/2001 | Shackle |
| 6,455,194 | B1 | 9/2002 | Maleki et al. |
| 6,855,273 | B2 | 2/2005 | Ravet et al. |
| 6,864,353 | B2 | 3/2005 | Kono et al. |
| 2004/0024174 | A1 | 2/2004 | Harvey et al. |
| 2008/0044731 | A1 | 2/2008 | Nishio et al. |
| 2008/0206647 | A1 | 8/2008 | Katsuyama et al. |

FOREIGN PATENT DOCUMENTS

| | | |
|---|---|---|
| EP | 0657485 A1 | 6/1995 |
| EP | 0994143 A1 | 4/2000 |
| EP | 1507268 A1 | 2/2005 |
| EP | 1568726 A1 | 8/2005 |
| EP | 1878759 A1 | 1/2008 |
| JP | 1995-206936 | 8/1995 |
| JP | 1995-324129 | 12/1995 |
| JP | H09-27313 A | 1/1997 |
| JP | 2004119343 A | 4/2004 |
| JP | 2006-169503 A | 6/2006 |
| JP | 2007-220376 A | 8/2007 |
| JP | 2008231408 A | 10/2008 |
| WO | 2008/048399 A1 | 4/2008 |

(Continued)

OTHER PUBLICATIONS

Third party observation (cover) submitted to the Japanese Patent Office on Dec. 3, 2012 for the corresponding Japanese Patent Application No. 2011-550199.

(Continued)

*Primary Examiner* — Doris Lee
(74) *Attorney, Agent, or Firm* — The Dobrusin Law Firm, P.C.

(57) ABSTRACT

The present invention is directed at a binder for a battery electrode comprising an ethylene oxide-containing copolymer including a first monomer of ethylene oxide (EO) and at least one additional monomer selected from an alkylene-oxide that is different from the first monomer of EO, an alkyl glycidyl ether, or a combination thereof; wherein the ethylene oxide-containing copolymer has a weight average molecular weight less than about 200,000 g/mole (e.g., from about 10,000 to about 100,000), the molar fraction of the first monomer of EO ($X_{EO}$) in the ethylene oxide-containing copolymer is greater than 0.80 (e.g., from about 0.80 to about 0.995), and the ethylene oxide-containing copolymer has a peak melting temperature ($T_p$), in ° C., for a selected $X_{EO}$ in the range of about 0.80 to about 0.995, which is below a maximum value of $T_{pmax}$, at the selected $X_{EO}$, which is calculated using the equation $T_{pmax}=(60-150(1-X_{EO}))$.

20 Claims, 4 Drawing Sheets

(56) References Cited

OTHER PUBLICATIONS

Third party observation (remarks) submitted to the Japanese Patent Office on Dec. 3, 2012 for the corresponding Japanese Patent Application No. 2011-550199.
International Search Report on Aug. 2, 2010 for PCT/US2010/023737 (parent application), filed on Feb. 10, 2010.
International Preliminary Report on Patentability mailed on Jun. 1, 2011 for PCT/US2010/023737 (parent application), filed on Feb. 10, 2010.
Huang, Yi-jun et al., "Random Copolymer of Propylene Oxde and Ethylene Oxide Prepared by Double Metal Cyanide Complex Catalyst," Chinese Journal of Polymer Science, vol. 20, No. 5 (2002), 453-459.
X. Andrieu, et al., Solid Polymer Electrolytes Based on Statistical Poly (Ethylene Oxide-Propylene Oxide) Copolymers, Electronics Acta (1995), 40(13-14), 2295-9.
Handbook of Batteries, 3rd Ed: David Linden and Thomas Reddy, Editors, McGraw-Hill, 2001, New York, NY, pp. 2.26-2.29.
L.Wild et al., "Determineation of Branching Distributions in Polyethylene and Ethylene Copolymers", Journal of Polymer Science, Polymer Physics Edition, 20 (1982) 441-455.
Z. Shen, et al., "Use of Rare Earth Coordination Catalyst for Ethylene Oxide and Propylene Oxide Copolymerization", Journal of Polymer Science, Part A: Polymer Chemistry (1990), 28(7), 1965-71.
M. Watanabe, et al., "Effects of Network Structures and Incorporated Salt Species on Electrochemical Properties of Polyether-Based Polymer Electrolytes". Solid State Ionics, 79 (1995) 206-312.
Z. Wen et al., "Thermal, Elecricial, and Methanical Properties of Composite Polymer Electrolytes Based on Cross-Linked Poly(Ethylene Oxide-co-Propylene Oxide) and Ceramic Filler", Solid State Ionics 160(2003) 141-148.
F. Rodriguez, Principles of Polymer Science, 2nd Editon, Hemisphere Publishing Co., 1982, p. 54.
L.Wild, T. R., Ryle, Determination of Branching Distributions in Polyethylene and Ethylene Copolymers, Journal of Polymer Science: Polymer Physics Edition, vol. 20, 441-445 (1982).
Chinese Office Action dated Aug. 26, 2014; Application No. CN20108007375.0.
Chinese Office Action dated May 27, 2014; Application No. CN20108007375.0.
Chinese Office Action dated Nov. 14, 2012; Application No. CN20108007375.0.
Notice of Third Party Communication dated May 13, 2013; Application No. EP10704683.1.
Japanese Office Action dated Jun. 18, 2013; Application No. JP2011-550199.
Japanese Office Action dated May 20, 2014; Application No. JP2011-550199.
Rejsek, V. et al., Macromolecules 2007, 40, 6510-6514, last access date Feb. 2, 2015.
Third Party Observation, Japanese Patent Application No. 2011-550199, dated Jan. 30, 2015.

DUCTILE POLYMER BINDERS AND BATTERY COMPONENTS USING THE SAME

CLAIM OF PRIORITY

The present application claims the benefit of the filing date of PCT Application Serial No. PCT/US2010/23737 (filed Feb. 10, 2010) (Published as WO 2010/093681 and U.S. Provisional Patent Application No. 61/151,739 (filed on Feb. 11, 2009) which are both incorporated herein by reference in their entirety for all purposes.

FIELD OF THE INVENTION

The present invention is directed generally at polymeric active battery components and particularly at ethylene oxide-containing copolymers that may be used as a binder material in a battery electrode that includes electroactive particles dispersed in the binder material.

BACKGROUND OF THE INVENTION

Rechargeable batteries have received tremendous attention in recent years. Such batteries also have come to be known as "secondary batteries" or even as "storage batteries". They can be operated to store a charge, and thereafter operated to discharge the charge to provide a source of electricity to a device. In general, these type of batteries have a small number of active components, which include the electrodes (specifically the anode and the cathode), which cooperate together to perform a reversible electrochemical reaction. In general, efforts to improve durability and efficiency of rechargeable batteries have concentrated in many instances upon the improvement of one of more of these active components.

One increasingly popular type of battery is a battery that employs a metal ion (e.g., a lithium-ion) in a generally cohesive mass of an electrolyte material. When an electrochemical cell of such a battery is discharging, generally lithium ions extracted from the anode flow to the cathode. When the cell is charging, the reverse process occurs. Lithium ions become extracted from the cathode and flow to and become inserted into the anode.

As indicated, the generally cohesive mass of electrolyte material is regarded as a solid electrolyte, even though some such solid electrolytes have gel characteristics. The metal ions (e.g., lithium ions) are present in a sufficient concentration, and are of such a size that as the ions flow between electrodes, the electrolyte and other active components may be actually susceptible to dimensional fluctuations as a result of the ion flow. Thus, as ions flow into a region, they will swell that region, and the region from which the ions flowed will shrink. Dimensional fluctuations may also arise as a result of heat build-up in the electrolyte due to the energy produced by the electrochemical reaction. In the design of active components for rechargeable batteries, it is therefore important that the materials employed for the active components be capable of withstanding the dynamic cyclical dimensional fluctuations.

As can be appreciated, materials suitable as electrodes for rechargeable batteries often require an appropriate balance of mechanical properties and electrical properties, which balance does not usually exist in a single homogeneous material. Thus, to achieve a suitable balance of properties it has been proposed to employ composite materials; that is, to employ materials that include two or more chemically and/or physically different constituent materials that are combined into a single material. The constituent materials, though forming a single composite material, will result in generally two or more discrete phases. The constituent materials effectively remain as separate and distinct materials within the composite. By way of example, particles of an active conductive material (referred to herein as electroactive particles or "EAPs") may be dispersed in a suitable binder material, such as a matrix formed of polymeric materials. The EAPs help provide desired electrical characteristics and the binder helps to impart appropriate mechanical or other properties. To this combination of materials it is also possible that one of more electrode materials (e.g., intercalation compounds) may be mixed. An example of a composite is illustrated in U.S. Pat. No. 6,455,194, in which a phenol-formaldehyde material is used in a binder, alone or with polyvinylidene fluoride (PVDF). See also, U.S. Pat. Nos. 6,855,273 and 6,174,623.

One possible approach to reduce the burden upon EAPs for delivering electrical characteristics has been to employ a conductive polymer such as PVDF in the binder. Unfortunately, existing conductive polymers have limited ability to combine with EAPs, because of their brittle characteristics, their high melting temperature, or both. Interfacial bods between the EAPs and the polymer tend to be relatively weak. In some instances, especially as a result of the cyclical dimensional fluctuations discussed above, the binder polymer and the EAPs may experience an undesirable degree of separation or "pull-out" in service, which has the potential to compromise battery performance. Long term durability issues thus may become a problem. Also, the brittle characteristic of polymers such as PVDF cannot be easily bent and folded which additionally limits the form factor of batteries including these materials.

Certain ethylene oxide-containing homopolymer or copolymer materials may exhibit attractive electrical characteristics for use as an active rechargeable battery component, such as in a binder of an electrode or in an electrolyte. However, these materials generally have been avoided because of synthesis constraints, the difficulties in achieving the necessary mechanical characteristics of the materials to effectively fulfill the processing and/or mechanical needs of the material in active component applications.

It would be particularly attractive to achieve a durable and long-lasting composite material that has utility as an electrode for a rechargeable battery, particularly one that has a strong adhesion to electroactive particles, even after undergoing mechanical deformation, such as the dynamic cyclical dimensional fluctuations typical during the cyclic charging of a battery. Additionally, it would be attractive to achieve a more flexible electrode which may improve the form factor (e.g., by the ability for free folding the electrode), be easier to process into a battery (and thus increase production yields), and eliminate the need for the relatively stiff packaging.

SUMMARY OF THE INVENTION

In its various aspects, the present invention meets the above needs and overcomes various disadvantages of the prior art by the realization of unpredictable characteristics in an ethylene-oxide copolymer that renders the material especially attractive for use in a rechargeable battery, such as in a composite electrode. Accordingly, one first aspect of the invention is directed at a binder material for a battery (e.g., for a battery electrode) comprising an ethylene oxide-containing copolymer (e.g., a random copolymer) including a first monomer of ethylene oxide (EO) and at least one additional monomer selected from an alkylene oxide that is different from the first monomer of EO, an alkyl glycidyl ether, an allyl glycidyl ether, or a combination thereof; wherein the ethylene oxide-containing copolymer has a weight average molecular weight less than about 200,000 g/mole, the molar fraction of the first monomer of EO ($X_{EO}$) in the ethylene oxide-containing copolymer is greater than 0.80, and the ethylene oxide-containing copolymer has a peak melting temperature ($T_p$), in ° C., for a selected $X_{EO}$ in the range of about 0.80 to about 0.995, which is below a maximum value of $T_{pmax}$, at the selected $X_{EO}$, which is calculated using the equation $T_{pmax} = (60-150 (1-X_{EO}))$. Preferably, the molar fraction of the first monomer of EO in the ethylene oxide-containing copolymer is from about 0.80 to about 0.995, the ethylene oxide-containing copolymer has a weight average molecular weight from about 10,000 to about 100,000, or both.

A second aspect of the invention is directed at a composite electrode such as a composite cathode, or a composite anode, including a binder material disclosed herein and further comprising a plurality of particles, which may be the same or different, wherein the ethylene oxide-containing copolymer is in contact with the plurality of particles. The composite may be a generally solid state material that includes a plurality of discrete phases including two, three or more phases. The particles preferably includes, or consists essentially of one or more electroactive particles (i.e., EAP), one or more graphites, one or more other carbon containing material, or any combination thereof.

A third aspect of the invention is directed at a solid polymer electrolyte including an ethylene oxide-containing copolymer and/or a binder material disclosed herein. The solid polymer electrolyte may include a metal salt, a solvent, or both.

A fourth aspect of the invention is directed at a device including a composite electrode disclosed herein having the features of any of the foregoing aspects. In one embodiment, the device is a secondary battery.

Another aspect of the invention is directed at a process for polymerizing an ethylene oxide-containing copolymer (such as one described herein for use in the binder material), comprising contacting a first monomer of EO and at least one additional monomer with an activated alkylaluminum catalyst in the presence of a hydrocarbon diluent. The ethylene oxide and the catalyst are preferably contacted at a reaction temperature that is at least about 5° C. lower than the melting temperature of the copolymer, for reacting the monomers to polymerize the copolymer.

Other aspects can be gleaned elsewhere from the present teachings.

As will be seen from the teachings herein, the present invention reflects a surprising approach and solution to tackling the problems heretofore faced in the art, which has been limited due to previously, irreconcilable tradeoffs in electrical and mechanical properties needed for battery applications. The ethylene-oxide containing copolymers of the present invention have a surprising balance of high ethylene oxide concentration and low melting point which make them particularly suitable as a binder material for electrolyte applications. It is also found that these polymers (which typically may exhibit some ionic conductivity) have a surprisingly strong adhesion to electroactive particles, even after undergoing mechanical deformation, such as the dynamic cyclical dimensional fluctuations typical during the cyclic charging of a battery.

DETAILED DESCRIPTION OF THE INVENTION

Figure 1A:
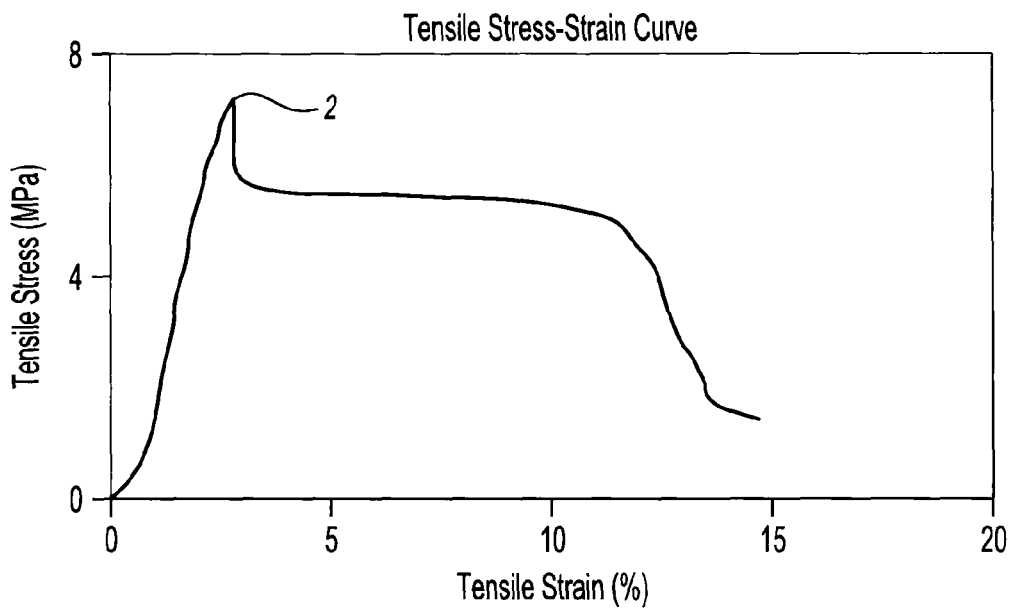
FIG. 1A illustrates a tensile stress-tensile strain curve of an example of a composite including an ethylene oxide-containing copolymer and 70 percent electroactive particles.

The electrodes according to the present teachings may generally be prepared as a multi-phase composite material that includes a polymeric binder phase (i.e., a binder material) and a particle phase. The particle phase preferably includes, or consists essentially of one or more electroactive particles, one or more graphites, one or more other carbon containing material, or any combination thereof. Without limitation, polymers in the polymeric binder phase may include one or more ethylene-oxide containing copolymers, and particularly random copolymers, as described herein.

The amount of ethylene-oxide containing copolymer in the binder phase may be sufficiently high so that the binder phase is ductile, so that the binder phase provides a generally continuous path for the flow of a cation, or both. The ethylene-oxide containing copolymer may be present at a concentration of at least 10 weight percent, preferably at least 50 weight percent, more preferably at least about 70 weight percent, and most preferably at least about 90 weight percent based on the total weight of all polymers in the polymeric binder phase. Without limitation, polymer in the polymeric binder phase may further comprise an ethylene-oxide homopolymer or copolymer. For example, the polymeric binder phase may include one or any combination of the ethylene-oxide homopolymers and copolymers disclosed in U.S. Pat. No. 4,303, 748, and U.S. Pat. No. 3,644,224, both incorporated herein by reference. The concentration of the total polymers in the polymeric binder phase may be sufficiently high so that the polymer is generally distributed throughout the binder phase. The concentration of the total polymers in the polymeric binder phase may be greater than about 10 weight percent, preferably at least about 20 weight percent and more preferably at least about 30 weight percent, and most preferably at least about 40 weight percent based on the total weight of the polymeric binder phase, the electrode, or both. The concentration of the total polymers in the polymeric binder phase may be less than about 90 weight percent, preferably less than about 70 weight percent, more preferably less than about 60 weight percent, and most preferably less than about 50 weight percent based on the total weight of the electrode.

The particle phase may include particles of one or more active conductive materials. By way of example, the particles may include one or more electroactive particles (described hereinafter), one or more graphites, one or more other carbon containing conductive materials, or any combination thereof. Preferably the particle phase includes or consists essentially of the one or more electroactive particles. The particle phase preferably includes a sufficient amount of the electroactive particles so that the composition can function as an electrode. The concentration of the electroactive particles in the particle phase preferably is about 60 weight percent or more, more preferably about 95 weight percent or more, and most preferably about 98 weight percent or more, based on the total weight of the particle phase. When employed in an electrode, the concentration of particles, (e.g., the concentration of the electroactive particles) in the composite electrode preferably is about 20 weight percent or more, more preferably about 35 weight percent or more, even more preferably about 50 weight percent or more, and most preferably about 60 weight percent or more, based on the total weight of the composite electrode. The concentration of the particles (e.g., the electroactive particles) in the composite electrode preferably is about 95 weight percent or less, more preferably about 90 weight percent or less, even more preferably about 85 weight percent or less, even more preferably about 80 weight percent or less, and most preferably about 70 weight percent or less, based on the total weight of the composite electrode.

The binder material preferably is a continuous phase so that the binder material provides a continuous matrix phase for carrying the particles of the particle phase. The particles (such as the EAPs) may be dispersed in the binder material as a discrete phase or a group of particles having a structure with connectivity between two or more particles. In one embodiment, the particles are present as adjoining aggregates. For example, the binder material may be a continuous phase such that at least 40 percent, preferably at least 70 percent and more preferably at least 90 percent of the binder material is one contiguous region of binder material. The particle phase may be a discrete phase such that each and every contiguous region of the particle phase contains less than about 20 percent, preferably less than about 10 percent, and more preferably less than about 5 percent of the particles. The dispersion of particles may be generally uniform throughout the matrix phase of the binder material As such, any volume containing about 5 percent of the composite material will preferably contain at least about 1 percent, and more preferably contain at least about 2 percent of the particles. The particles may be statistically randomly distributed in the matrix phase. For example, the EAPs may be statistically randomly distributed in the matrix phase.

With reference to FIGS. 1-4, it can be seen how the present invention derives various of its advantages. FIGS. 1A and 1B illustrate an example of a characteristic plot of tensile stress and strain. As illustrated by the plots of FIGS. 1A and 1B, composite materials of the present invention may also be characterized by the ability of the materials, upon being subjected to a tensile strain to exhibit a stress profile (e.g., when plotted on a Cartesian coordinate system with stress on the y-axis) that is essentially free of any kink (e.g., as shown by the relatively horizontal region 6 and/or the inflection point 8 at about 0.2 to 0.4 percent strain in FIG. 3), which is believed to correspond with elongation that is a result of EAP pullout. Additionally, FIG. 1A illustrates that the composite materials of the present invention may also be characterized by the ability of the materials, upon being subjected to a tensile stress to deform in a plastic (i.e., a ductile mode) and to have a peak 2 in the tensile stress (e.g., a yield point) prior to fracture. The durable adhesion between the binder material and electroactive particles of the present invention is further evidenced by a lack of an inflection point 8, a lack of an relatively horizontal region 6, a lack of a peak 2, or any combination thereof, in the stress vs. strain curve at low strains (e.g., less than about 2 percent). The stress versus strain curve may be measured according to ASTM D882-97, as described hereinafter. A relatively horizontal region is a region having a lower slope than both the region immediately preceding and the region immediately following the relatively horizontal region.

Figure 2:
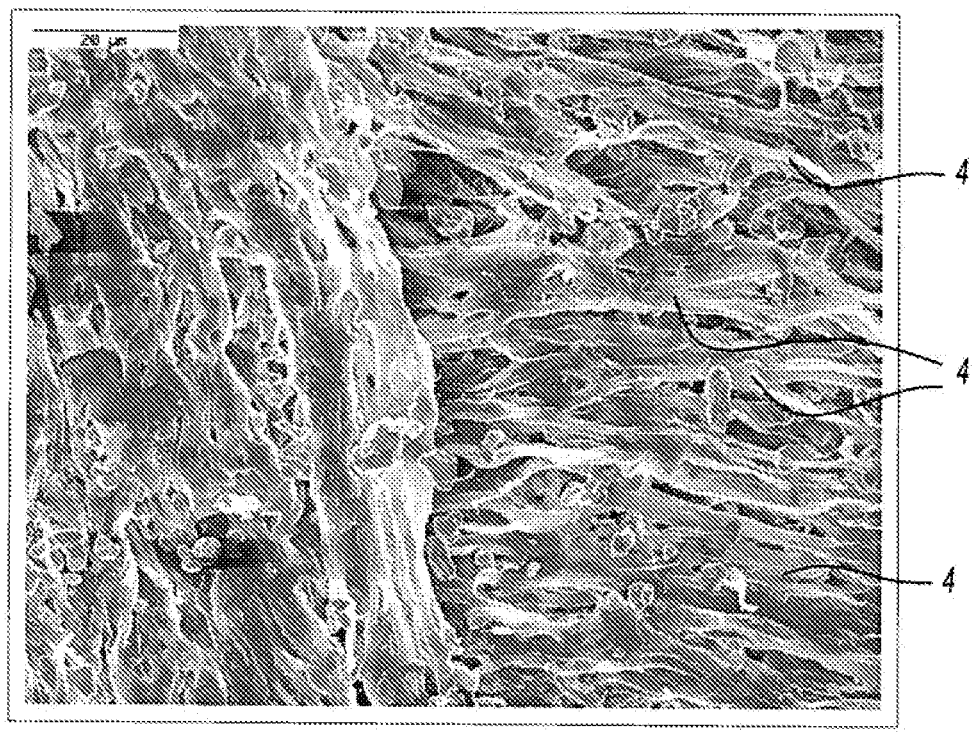
FIG. 2 is a scanning electron microscope micrograph illustrating an example of a composite electrode of the present teachings including a random copolymer of ethylene oxide and propylene oxide and electroactive particles.
Figure 4:
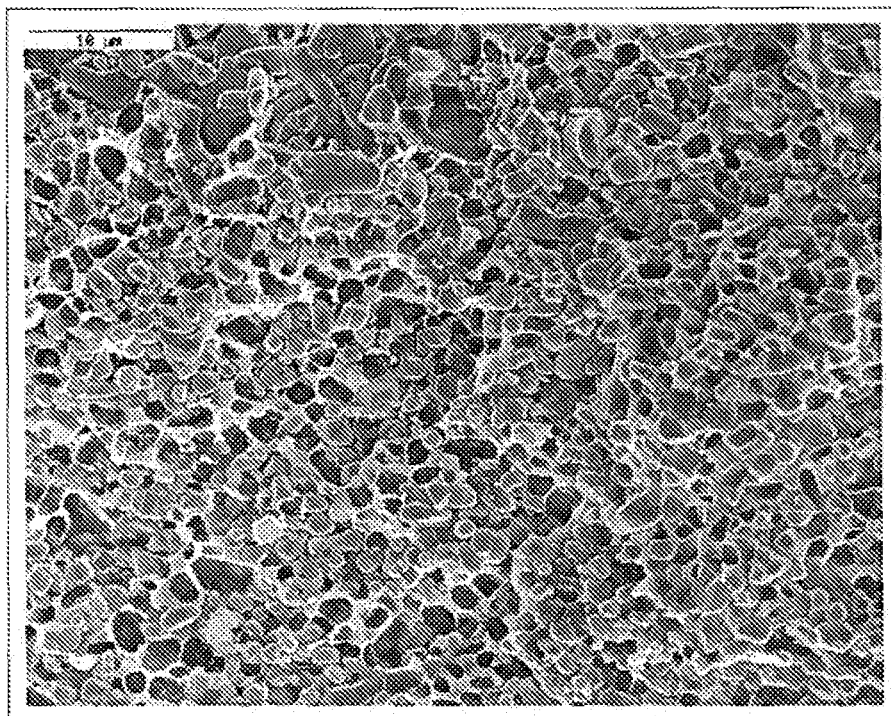
FIG. 4 is a scanning electron microscope micrograph illustrating an example of particle pull-out of an illustrative composite electrode including polyvinylidenefluoride (PVDF) and electroactive particles.

It is believed that the microstructures as shown in FIG. 2 (as contrasted with that of FIG. 4) helps contribute to these unique mechanical properties. More particularly, FIG. 2 is a micrograph that depicts an illustrative microstructure, showing particles generally uniformly dispersed in a polymeric matrix. The particles appear as generally spherical and ellipsoidal EAPs (some exhibiting pores or cavities) having a largest dimension, on average, smaller than about 10 µm. Preferred particles have a largest dimension from about 0.5 to about 7 µm. Some particle aggregates are seen and may be present throughout the material. The polymeric matrix is depicted in its expected state after being subjected to a tensile stress to fracture. Among the unique and unexpected features is that the particles are in substantial bonding contact with the polymeric material of the matrix, and there is a general absence of any significant amount of voids which would be indicative of particle pullout. The composite material in FIG. 2 has fractured in a predominantly ductile mode as evidenced, for example, by the aligned striations 8 evident from plastic deformation of the polymeric matrix. In contrast, FIG. 4 illustrates a microstructure of an expected fracture surface state of a material including EAPs in a matrix of PVDF after being subjected to a tensile stress to fracture. FIG. 4 illustrates that this material, containing a matrix of PVDF, is a more brittle material characterized by a number of dark voids that represent locations where EAP particles used to reside but which were unable to withstand tensile stresses and pulled out of the polymeric matrix. Thus, the very fact that particles remain dispersed within the polymeric matrix of the binders herein is believed indicative of the tenacious bonds achievable using the present polymers, unlike that using prior art PVDF matrix materials.

Electrode

The copolymers of the binder materials disclosed herein preferably are used in an electrode (e.g., an anode, a cathode, or both) of a battery such as a secondary battery. For example the binder material, including the ethylene oxide-containing polymer, preferably is mixed with electroactive particles (EAPs) to form a composite electrode that has the EAPs dispersed in a polymeric matrix from the binder. As a second example, the binder phase may be mixed with graphite or other suitable intercalation material for use in a composite electrode. In one embodiment, such composite may comprise two or more distinct phases. Such a composite may be a binary system having two distinct phases. Ternary or other systems having more than two phases are also possible.

The present invention makes advantageous use of polymers in a binder material for a battery electrode. The polymers are such that the electrode realizes a surprising balance of electrical properties and mechanical properties, including, without limitation, the realization of some or all of the following: (i) durable adhesion between the polymer of the binder material and electroactive particles as evidenced by a lack of an inflection point and a lack of a peak in the tensile stress vs. strain curve of the electrode at low strains (preferably at strains less than about 2 percent) as measured according to ASTM D882-97, using sample the sample type described in ASTM D638-03 IV; (ii) an electrical conductivity (e.g., ionic conductivity) at 30° C. greater than an analogous electrode prepared using an ethylene oxide homopolymer; (iii) a tensile elongation at failure of the electrode of at least 6 percent as measured according to ASTM D882-97, using sample type described in ASTM D638-03 IV; or (iv) any combination thereof. The realization of such specifics in the electrodes herein is even more unexpected because preferred polymers are ethylene oxide-containing copolymers, such as copolymers that include a first monomer of ethylene oxide and at least one additional monomers selected from a different alkylene oxide, an alkyl glycidyl ether, or any combination thereof. Heretofore, it has been difficult to achieve such characteristics in existing ethylene oxide-containing polymeric materials, such as ethylene oxide-containing polymers that are not random copolymers, owing to intrinsic brittleness, poor electrical properties of copolymerized monomers, or other causes.

The teachings herein also contemplate the possibility of a secondary battery that includes two or more electrodes. At least one of the electrodes preferably will be a composite electrode that employs the binder materials taught herein. One preferred approach envisions at least two adjoining or even directly contacting electrodes, wherein one of the electrodes is a composite electrode. For example, batteries may include at least one composite cathode adjoining (e.g., in direct contact with) a composite anode. Preferably the electroactive particles of the cathode composite do not contact the particles (e.g., anode active particles) of the anode composite. Preferred anode active particles are graphite particles. To separate the cathode active particles (e.g., the electroactive particles) in the cathode composite (i.e., the first layer) and the anode active particles (e.g., the graphite particles) in the anode composite (i.e., the second layer) the battery may employ a third layer, such as a separator. Alternatively, the third layer may be a solid polymer electrolyte. Preferably the third layer is essentially free of, or even entirely free of EAPs and/or graphite. If employed, the concentration of EAPs, the concentration of graphite particles, or both in the third layer preferably is about 2 weight percent or less based on the total weight of the third layer. The binder materials of the present invention may be used in any or all (e.g., one, two, or three) of the solid polymer electrolyte containing layers of a battery cell.

Ethylene Oxide-Containing Copolymer

The ethylene oxide-containing copolymer may be a copolymer of at least one first monomer, and at least one additional monomer (e.g., at least one second monomer). The at least one first monomer will preferably be ethylene oxide or a derivative thereof. Preferred monomers for the second monomer include alkylene oxides other than ethylene oxide (e.g., alkylene oxides having at least 3 carbon atoms, such as propylene oxide, and butylene oxide), allyl glycidyl ether, alkyl glycidyl ether (e.g., methyl glycidyl ether), or any combination thereof. Preferably the second monomer includes an alkylene oxide, an allyl or alkyl glycidyl ether, or mixtures thereof. More preferably the second monomer includes propylene oxide, butylene oxide, methyl glycidyl ether or any combination thereof. More preferably the at least one second monomer may include, consist essentially of, or even consist of propylene oxide. The total concentration of monomers selected from the group consisting of alkylene oxide, alkyl or allyl glycidyl ether, or any combination thereof (e.g., ethylene oxide and propylene oxide), preferably is about 96 weight percent or more, more preferably about 98 percent or more, and even more preferably about 99 weight percent or more, and most preferably about 100 weight percent, based on the total weight of the ethylene oxide-containing copolymer.

The ethylene oxide-containing copolymer may include a relatively high concentration of ethylene oxide, and preferably sufficiently high so that the ionic conductivity of an electrolyte including the copolymer and a metal salt is at least 75 percent, preferably at least 100 percent, more preferably at least 125 percent and most preferably at least about 150 percent of the ionic conductivity of an identical electrolyte substituting a polyethylene oxide homopolymer for the copolymer. Preferably, such an increase in the conductivity is observed when the conductivity is measured at a temperature of about 50° C., about 60° C., about 70° C., or any combination thereof.

Advantageously, the ethylene oxide-containing copolymer includes a sufficiently high concentration of ethylene oxide, so that the electrical conductivity (e.g., ionic conductivity) of the ethylene oxide-containing copolymer, is realized in sufficient amount to make it suitable for a battery application, when the polymer contains metal cations. Without being bound by theory, a high ethylene oxide concentration may improve the conductivity of an electrode containing a metal salt, electroactive particles, a solvent, or any combination thereof. Preferred ethylene oxide-containing copolymer may have an ethylene oxide mole fraction, $X_{EO}$ of about 0.80 or more, more preferably about 0.85 or more, even more preferably about 0.90 or more, even more preferably about 0.94 or more, even more preferably about 0.94 or more, and most preferably about 0.95 or more, based on the total moles of monomer in the copolymer. Preferred ethylene oxide-containing copolymers may contain a molar fraction of ethylene oxide of about 0.995 or less, more preferably about 0.98 or less, even more preferably about 0.97 or less, and most preferably about 0.96 or less, based on the total moles of monomer in the copolymer.

The mole fraction of the at least one additional monomers in the ethylene oxide-containing copolymer may be sufficiently high so that the ethylene oxide-containing copolymer is generally ductile. The mole fraction of the at least one additional monomer (e.g., the second monomer) in the ethylene oxide-containing copolymer preferably is about 0.005 or more, more preferably about 0.02 or more, even more preferably about 0.03 or more, even more preferably about 0.04 or more, and most preferably about 0.05 or more. The mole fraction of the at least one additional monomer (e.g., the second monomer) preferably is less than about 0.20, more preferably less than about 0.15, and most preferably less than about 0.12. Exemplary ethylene oxide-containing copolymer also include copolymers have a mole fraction of alkylene oxide other than ethylene oxide, alkyl or allyl glycidyl ether, or any combination thereof, of at least about 0.005, preferably at least about 0.02, more preferably at least about 0.03, and most preferably at least about 0.05. The mole fraction of alkylene oxide other than ethylene oxide, alkyl or allyl glycidyl ether, or any combination thereof, may be less than about 0.20, preferably less than about 0.15, and more preferably less than about 0.12.

The ethylene oxide-containing copolymer preferably will exhibit at least some crystallinity, and preferably crystallinity of a sufficient amount that the copolymer is relatively rigid and viscous. The crystallinity of the ethylene oxide-containing copolymer may be measured using differential scanning calorimetry, as described later herein in the Test Methods section. The crystallinity of the ethylene oxide-containing copolymer preferably is about 50 weight percent or less, more preferably about 40 weight percent or less, even more preferably about 30 weight percent or less, and most preferably less about 25 weight percent or less, based on the total weight of the copolymer. The copolymer preferably has a crystallinity of about 3 weight percent or more, more preferably about 6 weight percent or more, even more preferably about 10 weight percent or more, and most preferably about 15 weight percent or more, based on the total weight of the copolymer. Though crystallinity is expected and preferred, it is possible that suitable ethylene oxide-containing copolymers may be completely amorphous.

The ethylene oxide-containing copolymers useful for various aspects of the invention typically have a melting temperature less than the melting temperature of polyethylene oxide homopolymer having the same weight average molecular weight. Polyethylene oxide homopolymers typically have a melting temperature of about 63° C. Ethylene oxide-containing copolymers which are block copolymers typically have a melting temperature similar to the melting temperature of polyethylene oxide homopolymer. Preferably the ethylene oxide copolymer is a generally random copolymer. The copolymers (e.g., the random copolymers) of the present invention surprisingly may have both high ethylene oxide concentrations and low melting temperature. For example, preferred copolymers may have a peak melting temperature ($T_p$), in ° C., for a selected mole fraction of ethylene oxide ($X_{EO}$) which is below a maximum value of $T_{pmax}$, at the selected $X_{EO}$, which may be calculated using the equation $T_{pmax}=(60-150(1-X_{EO}))$, preferably using the equation $T_{pmax}=(60-176(1-X_{EO}))$, more preferably using the equation $T_{pmax}=(60-200(1-X_{EO}))$, even more preferably using the equation $T_{pmax}=(60-250(1-X_{EO}))$, and most preferably using the equation $T_{pmax}=(60-280(1-X_{EO}))$. The melting temperature may be measured by differential scanning calorimetry as later described herein in the Test Methods section. Such copolymers preferably have an $X_{EO}$ from about 0.80 to about 0.995.

Preferred ethylene oxide-containing copolymers may have a melting temperature (as measured by differential scanning calorimetry) at least 3° C., preferably at least 6° C., more preferably at least 8° C., and most preferably at least 10° C., less than the melting temperature of a copolymer having the same mole fraction of ethylene oxide (as measured by $^1$H NMR spectroscopy as described herein in the section labeled "Test Methods"), having the same second monomer, and made with a catalyst (e.g., a calcium catalyst) which results in a random copolymer that is relatively blocky.

The polymer of the binder material (e.g., the ethylene oxide-containing copolymer) may have a tensile modulus (i.e. Young's modulus) of at least about 5 MPa, preferably at least about 20 MPa, and more preferably at least about 40 MPa, as measured according to ASTM D638-03. The tensile modulus may be less than about 400 MPa, preferably less than about 200 MPa, more preferably less than about 150 MPa, and most preferably less than about 100 MPa.

The degree of blockiness, BI, in a random copolymer may be calculated by the ratio of the concentration of diad fractions of ethylene oxide monomer added to the second monomer f(EO–AO) plus the diad fractions of the second monomer added to the ethylene oxide f(AO–EO) to the theoretical concentration of diad fractions for a statistical random copolymer $2X_{EO}(1-X_{EO})$, where $X_{EO}$ is the volume fraction of ethylene oxide monomer:

$$BI=(f(EO-AO)+f(AO-EO))/(2X_{EO}(1-X_{EO}))$$

By definition a statistically random copolymer has a blockiness index (BI) of one (1.0). Blocky random copolymers will have a lower concentration of EO–AO and AO–EO diad fractions, and BI will be less than 1.0. Block copolymers will have very low concentrations of EO–AO and AO–EO diad fractions and BI will be much less than 1 and approach zero. On the other end, alternating copolymers having $X_{EO} \geq 0.5$ will have $BI=1+(1/X_{EO})$. The concentration of the diad fractions and $X_{EO}$ may be measured using $^{13}$C NMR spectroscopy, using the peak assignments and techniques described by Yi-Jun Huange et al. in "Random Copolymers of Propylene Oxide and Ethylene Oxide Prepared by Double Metal Cyanide Complex Catalyst", Chinese Journal of Polymer Science, 20:5, 2002, pages 453-459, incorporated herein by reference in its entirety.

Preferred ethylene oxide-containing copolymers may have a blockiness index, BI, about 0.70 or more, more preferably about 0.75 or more, even more preferably about 0.80 or more, even more preferably about 0.85 or more, even more preferably about 0.90 or more, and most preferably about 0.95 or more. The blockiness index preferably less than about $1+(0.8/X_{EO})$, more preferably less than about $1+(0.5/X_{EO})$, even more preferably less than about $1+(0.25/X_{EO})$, and most preferably less than about $1+(0.10/X_{EO})$ where $X_{EO}$ is the molar fraction of ethylene oxide monomer in the copolymer and $X_{EO}$ is at least 0.5.

The less blocky arrangement of the comonomers typically results in a copolymer having a relatively low melting temperature. For example, the ethylene oxide-containing copolymer may have a melting temperature (e.g., a peak melting temperature) of about 54° C. or less, preferably about 52° C. or less, more preferably about 50° C. or less, even more preferably about 48° C. or less, and most preferably about 46° C. or even less. The ethylene oxide-containing copolymers may be completely amorphous, such as having a peak melting temperature below room temperature. The ethylene oxide-containing copolymer preferably has a melting temperature (e.g., a peak melting temperature) of about 25° C. or more, more preferably about 35° C. or more, even more preferably about 40° C. or more, even more preferably about 42° C. or more, and most preferably about 44° C. or more.

The binder material is preferably a ductile material having a relatively high shear modulus. Although the shear modulus typically decreases with the concentration of comonomer in the ethylene oxide-containing polymer, the shear modulus of a copolymer having an ethylene oxide concentration of about 94.3 mole percent may be greater than about 80 MPa, preferably greater than about 100 MPa, and more preferably greater than about 110 MPa. The binder material is preferably ductile at room temperature, more preferably at 0° C., and most preferably at −20° C. Ductility of the ethylene oxide-containing copolymer, the electrode, or both may be quantified by a tensile elongation greater than about 10 percent or even greater than about 12 percent.

Synthesis of the ethylene oxide-containing copolymer advantageously may achieve a relatively low molecular weight polymer, but without the employment of a processing step to reduce the molecular weight, such as an irradiation step or other chain scission step. By way of illustration, it is possible according to the present teachings for the ethylene oxide-containing copolymer to have an average molecular weight (e.g., a number average molecular weight, Mn, a weight average molecular weight, Mw, or both) less than about 1,000,000, preferably less than about 500,000, and more preferably less than about 200,000, and most preferably less than about 100,000 Daltons. It is also possible according to the present teachings to synthesize ethylene oxide-containing copolymers that have a number average molecular weight greater than about 1,000, preferably greater than about 3,000, more preferably greater than about 10,000, and most preferably greater than about 18,000 Daltons.

The ethylene oxide-containing copolymer may have a relatively narrow molecular weight distribution. For example, the polydispersity index (PDI=Mw/Mn) may be less than about 3.0, preferably less than about 2.0, more preferably less than about 1.70, most preferably less than about 1.30. Without limitation, exemplary copolymers according to the present teachings have a polydispersity index less than about 1.20, or even less than about 1.12. Polydispersity of about 1.10 or less is even possible.

Polymerization Process Using Homogeneous Catalyst

Without intending to be bound by theory, various of the unexpected advantages herein are derived as a result of a particularly preferred synthesis process and with no intention to limit synthesis to the present teachings. More particularly, though the ethylene oxide-containing copolymers in accordance with the present invention may be prepared by a synthesis reaction using at least one heterogeneous catalyst, homogeneous catalyst or a combination thereof, one particularly preferred approach involves synthesizing using at least one homogeneous catalyst. Preferably the ethylene oxide-containing copolymer is synthesized using only at least one homogeneous catalyst and without a heterogeneous catalyst. The homogeneous catalyst may be a metal containing catalyst, such as an aluminum catalyst. Exemplary aluminum catalysts include, without limitation, one or more aluminum containing compounds, such as an alkylaluminum catalyst, and particularly one or more trialkylaluminum compounds. A particularly preferred catalyst is triisobutylaluminum. The trialkylaluminum catalyst may be present at a molar ratio of about 1 to 30 mmol, preferably from about 2 to 20 mmol, and more preferably from about 3 to about 8 mmol, per mole of ethylene oxide.

The polymerization process may also include use of a Lewis base, such as a Lewis base that acts an initiator for polymerization. Thus, the polymerization process may include a step of reacting the Lewis base and the catalyst to form an activated catalyst. Any Lewis base capable of activating the catalyst may be used. The Lewis base may be an amine, such as an amine having 4 to 20 carbon atoms. Exemplary Lewis bases include without limitation monoalkylamines (e.g., n-butyl amine), dialkylamines (e.g., diethylamine), trialkylamines (e.g., triethylamine), triphenyl phosphine, pyridine, and the like. The polymerization process may begin when the catalyst is activated with the Lewis base (e.g., the amine). The ratio of the Lewis base (e.g., the amine) to the aluminum in the catalyst may be greater than 0.05, preferably greater than 0.10, more preferably greater than 0.20 and most preferably greater than 0.25. The ratio of the Lewis base (e.g., the amine) to the aluminum may be less than about 1.5, preferably less than 0.90, more preferably less than about 0.80, and most preferably less than about 0.75.

The polymerization process may be a slurry process using a hydrocarbon diluent. Preferred hydrocarbon diluents include alkanes having from 5 to about 20 carbon atoms, preferably from about 5 to about 12 carbon atoms. The hydrocarbon diluent may consist of one alkane, or may be a mixture including or consisting of one, two, three or more alkanes. Without limitation, exemplary hydrocarbon diluents include pentanes (e.g., isopentane), hexanes (e.g., n-hexane), heptanes, octanes, and decanes. One particularly preferred hydrocarbon diluent is isopentane.

The polymerization process may be a batch process, a continuous process, or any combination. The process may include steps of feeding into one or more reaction vessels the ethylene oxide, the one or more second monomer (e.g., propoylene oxide), or both. Feeding may be done as a single charge (e.g. prior to activation of the catalyst), as a plurality of charges, as a continuous feed at a constant feed rate or at variable feed rate, or any combination thereof.

The second monomer may be an alkylene oxide, an alkyl glycidyl ether, an allyl glycidyl ether, or any combination thereof. Preferably the second monomer includes an alkylene oxide, an allyl glycidyl ether, or any combination thereof. Without limitation, exemplary alkylene oxides include propylene oxide, butylene oxide, or both. Exemplary alkyl glycidyl ethers include methyl glycidyl ether, ethyl glycidyl ether, propyl glycidyl ether and butyl glycidyl ether. Most preferably, the second monomer includes, consists essentially (e.g., at least 90 percent, at least 95 percent, or at least 99 percent) of, or even entirely of propylene oxide. The second monomer may be provided at a molar ratio of less than about 0.25, preferably less than about 0.12, more preferably less than about 0.10, even more preferably less than about 0.06, and most preferably less than about 0.04 moles, per mole of ethylene oxide.

The polymerization process may include a step of providing the ethylene oxide which includes a step of feeding the ethylene oxide at a molar rate $F_{EO}$. The process of providing the second monomer may include a step of feeding the second monomer (e.g., an alkylene oxide) at a molar rate $F_{AO}$. Preferably $F_{AO}/F_{EO}$ is from about 0.010 to about 0.150, more preferably from about 0.015 to about 0.10, and most preferably from about 0.020 to about 0.080.

The process may also include a step of terminating the reaction. The termination step may include a step of adding to a vessel in which the reaction is occurring a compound bearing an active proton, a step of reducing the temperature (e.g., by at least about 12° C.) within one or more reaction zones where the reaction is occurring, or both. Without limitation, compounds with active protons that may be used include alcohols having from 1 to 20 carbon atoms (e.g., alcohols having from 3 to 10 carbon atoms). Exemplary alcohols include methanol, ethanol, propanol (e.g., 2-propanol or n-propanol), butanol, pentanol, hexanol, octanol, and decanol. Mixtures of compounds bearing active protons may also be used. The active proton-containing compound may be added at a molar ratio of active proton to metal (e.g., aluminum, such as aluminum of the alkylaluminum catalyst) from about 10:1 to about 3:1. One preferred alcohol is 2-propanol.

The polymerization process preferably includes a step of introducing a metal oxide or other suitable anti-fouling agent into a reaction vessel. Any anti-fouling agent known to the skilled artisan may be used. One preferred agent may include aluminum oxide or silica (e.g., fumed silica, such as hydrophilic silica), or a combination thereof. In one aspect of the invention, the polymerization process may be conducted substantially free of the presence of any treated silica (e.g., hydrophobic silica). If employed, the anti-fouling agent preferably is used at about 30 weight percent or less, more preferably about 10 weight percent or less, even more preferably less about 5 weight percent or less, and more preferably about 3 weight percent or less, based on the weight of the ethylene oxide. The anti-fouling agent preferably is employed at a concentration of about 0.01 weight percent or more, more preferably about 0.1 weight percent or more, and most preferably about 1.0 weight percent or more, based on the weight of the ethylene oxide. Preferably the reaction is free of calcium (e.g., free of a calcium catalyst). If present, the mole fraction of calcium atoms preferably is about 0.40 or less, more preferably about 0.20 or less, even more preferably about 0.05 or less, even more preferably about 0.01 or less, and most preferably about 0.005 or less, based on the total moles of calcium and aluminum atoms in the catalyst. For example, the copolymer may be a reaction product of a synthesis using a catalyst which is essentially free of calcium (i.e., contains less than about 1000 parts per million calcium by weight, based on the total weight of the catalyst).

A preferred polymerization process preferably includes a step of polymerizing the monomer mixture (e.g., ethylene oxide and propylene oxide) at a temperature less than the expected peak melting temperature in ° C. ($T_{pe}$) of the ethylene oxide-containing copolymer, preferably less than $T_{pe}$-5° C., more preferably less than $T_{pe}$-8° C., and most preferably less than $T_{pe}$-10° C. The polymerization process thus may be a slurry polymerization process. Preferred polymerization temperatures (e.g., measured at or near the center of a reaction vessel) include temperatures at or below about 50° C., preferably at or below about 45° C., more preferably at or below about 40° C., even more preferably at or below about 37° C., even more preferably at or below about 35° C., and most preferably at or below about 33° C. The reaction temperature may be at or above about 10° C., preferably at or above about 20° C., more preferably at or above about 25° C., and most preferably at or above about 30° C. For example, the process may include a step of maintaining (e.g., for the entirety of the polymerization process) the polymerization temperature below 50° C., preferably below 45° C., more preferably below 40° C., even more preferably below 37° C., and most preferably below 35° C.

A polymerization process will desirably produce a random copolymer, such as one or any combination of the properties described above for an ethylene oxide-containing copolymer. For example, the random copolymer may have one or any combination of the following characteristics: (i) a peak melting temperature, $T_p$, for a selected $X_{EO}$ which is below a maximum value of $T_{pmax}$ at the selected $X_{EO}$, using the equation $T_{pmax}=60-150(1-X_{EO})$ (preferably $T_{pmax}=60-175(1-X_{EO})$) where $X_{EO}$ is the mole fraction of ethylene oxide (and $X_{EO}$ is greater than 0.5, preferably greater than 0.8); (ii) a melting temperature (i.e., a peak melting temperature) at least 5° C. less than the melting temperature of an ethylene oxide copolymer having the same ethylene oxide concentration and polymerized using a calcium catalyst; (iii) a number average molecular weight from about 3,000 to about 500,000 (e.g., from about 10,000 to about 200,000) Daltons; a tensile elongation at failure of at least 10 (e.g., at least 12 percent); (iv) an elastic modulus greater than about 200 MPa; a shear modulus greater than about 100 MPa; (v) a polydispersity index less than about 3 (preferably less than about 1.7, more preferably less than about 1.3, most preferably less than about 1.12); (vi) a molar fraction of the second monomer (e.g., propylene oxide) less than about 0.10 (preferably from about 0.02 to about 0.07) based on the total moles of the monomers in the copolymer; (vii) a powder or other particulated form which is substantially free, or even entirely free of reactor fouling; (viii) it is substantially free, or even totally free, of inorganic solid residues having a mean particle size (or even top particle size) greater than about 10 μm, or (ix) any combination of (i) through (viii).

Binder Material

The invention also contemplates making a binder material (i.e., the binder phase) including an ethylene oxide-containing copolymer disclosed herein. In addition to the copolymer, the binder material may further comprise a metal salt (e.g., a lithium salt), a solvent, or both. The binder material most preferably is a solid polymer electrolyte. The binder materials may be crosslinked, or free of crosslinking. The binder material preferably is substantially free of any crosslinks, or has a low crosslink density. If the polymer of the binder material has crosslinks, the crosslink density, in units of micromoles of crosslinks per g of polymer, is preferably below 500 μmole/g or less, more preferably about 100 μmole/g or less or even more preferably about 20 μmole/g or less, and most preferably about 10 μmole/g or less. The polymer of the binder material may be water soluble, for example at a concentration of about 0.2 weight percent. The binder material may include a sufficient amount of polymer to form a matrix capable of containing the particles. The polymer of the binder material generally will be included at a concentration greater than about 10 weight percent, preferably greater than about 20 weight percent, more preferably greater than about 30 weight percent and most preferably greater than about 40 weight percent based on the total weight of the binder material. The binder material may consist substantially of (e.g., a concentration greater than about 95 percent, or greater than about 98 weight percent based on the total weight of the binder material), or even essentially entirely of the polymer of the binder material. The polymer of the binder material may be present at a concentration less than 90 weight percent, preferably less than about 85 weight percent and more preferably less than about 80 weight percent based on the total weight of the binder material.

The metal salt may be present at a concentration sufficiently high so that the binder material doped with the metal salt demonstrates measurable conductivity. The concentration of the metal salt is preferably greater than about 0.2 weight percent, more preferably greater than about 1 weight percent, and most preferably greater than about 3 weight percent based on the total weight of the binder material. The metal salt may be present at a concentration less than about 45 weight percent, preferably less than about 25 weight percent, more preferably less than about 20 weight percent and most preferably less than about 14 weight percent, based on the total weight of the polymer binder.

The solvent, if employed, may be at any concentration that provides the desired balance of mechanical and electrical properties. Typically, the concentration of the solvent is at least about 5 weight percent, more typically at least about 10 weight percent, and most typically at least about 15 weight percent based on the total weight of the electrolyte composition. The solvent may be present at a concentration as high as about 90 weight percent, more typically at a concentration less than about 70 weight percent, based on the total weight of the electrolyte composition.

A single salt or a mixture of two or more different salts may be used. Any salt that can contribute to the ionic conductivity of a composition including the ethylene oxide-containing copolymer may be used. The salt may include or consist essentially of one or more inorganic salts. By way of example, the inorganic salt may be a salt having a metallic cation (i.e., a metal salt) or may be free of metallic cations (such as in an ammonium salt). Any metal or combination of metals may be employed in the metal salt. Preferred metal salts includes alkali metal salts and alkaline earth metal salts. By way of example, the metal salt may include lithium, sodium, beryllium, magnesium, or any combination thereof. A particularly preferred metal salt is a lithium salt. Without limitation, the lithium salt may include, consist substantially of, consist essentially of, or even consist of lithium trifluoromethane sulfonate (lithium triflate or $LiCF_3SO_3$), lithium hexafluorophosphate ($LiPF_6$), lithium hexafluoroarsenate ($LiAsF_6$), lithium imide ($Li(CF_3SO_2)_2N$), lithium tris(trifluoromethane sulfonate) carbide ($Li(CF_3SO_2)_3C$), lithium tetrafluoroborate ($LiBF_4$), $LiBF$, $LiBr$, $LiC_6H_5SO_3$, $LiCH_3SO_3$, $LiSbF_6$, $LiSCN$, $LiNbF_6$, lithium perchlorate ($LiClO_4$), lithium aluminum chloride ($LiAlCl_4$), $LiB(CF_3)_4$, $LiBF(CF_3)_3$, $LiBF_2(CF_3)_2$, $LiBF_3(CF_3)$, $LiB(C_2F_5)_4$, $LiBF(C_2F_5)_3$, $LiBF_2(C_2F_5)_2$, $LiBF_3(C_2F_5)$, $LiB(CF_3SO_2)_4$, $LiBF(CF_3SO_2)_3$, $LiBF_2(CF_3SO_2)_2$, $LiBF_3(CF_3SO_2)$, $LiB(C_2F_5SO_2)_4$, $LiBF(C_2F_5SO_2)_3$, $LiBF_2(C_2F_5SO_2)_2$, $LiBF_3(C_2F_5SO_2)$, $LiC_4F_9SO_3$, lithium trifluoromethanesulfonyl amide (LiTFSA), or any combination thereof. Combinations of lithium salts may also be used. Similarly, any of the above salts may also be combined with a different salt, such as a different metal salt, or even with a salt that is free of a metallic cation (such as an ammonium salt). If employed, the one or more lithium salts may be some or all of the salt in the binder material or the electrolyte composition. The amount of lithium salt, based on the total amount of metal salt, may be sufficiently high so that the concentration of metal ions per weight of metal salt is generally high. Preferably, the concentration of the lithium salt (such as the concentration of any one or any combination of the above lithium salts) is about 30 weight percent or more, more preferably about 50 weight percent or more, even more preferably about 70 weight percent or more, even more preferably about 95 weight percent or more, and most preferably about 98 weight percent or more, based on the total weight of the inorganic salt. One particularly preferred lithium salt is a lithium salt that includes lithium triflate. Preferably the inorganic salt, the lithium salt, or both includes lithium triflate at a concentration of about 95 weight percent or more, and more preferably about 98 weight percent or more. Most preferably the inorganic salt, the lithium salt, or both, consists essentially of, or consists entirely of lithium triflate.

The ratio of the molar concentration of oxygen atoms (e.g. moles of —C═O, C—O—C, and —C—OH groups, where C refers to carbon atoms, O refers to oxygen atoms and H refers to hydrogen atoms) from the polymer of the second phase (e.g., the EOP polymer) to the molar concentration of metal anions (e.g., moles of M+) from the metal salt (i.e., the O:M ratio). For lithium salt, the O:LI ratio is the ratio of the molar concentration of oxygen atoms from polymer of the second phase (e.g., the EOP polymer) to the molar concentration of Li ions from the lithium salt. Preferably the O:M ratio (e.g., the O:Li ratio) is about 1:1 or more, more preferably about 2:1 or more, even more preferably about 4:1 or more, and most preferably about 10:1 or more. Preferred electrolyte compositions have an O:M ratio (e.g., an O:Li ratio) of about 120:1 or less, more preferably about 80:1 or less, even more preferably about 60:1 or less, even more preferably about 40:1 or less, and most preferably about 30:1 or less. By way of example, the O:M ratio (e.g., the O:Li ratio) of the electrolyte composition may be about 10, about 15, about 20, or about 25. In determining the O:M ratio, the O:Li ratio, or both, the oxygen in the polymer in the first phase (e.g., the polymer in the organic particles) preferably is not included when calculating the molar concentration of oxygen atoms.

The binder material may further comprise a solvent or carrier, referred to collectively as solvent. The solvent may selected so that the mobility of a cation or anion in the binder material is increased. The solvent may be a solid or liquid at a temperature of about 25° C. Preferred solvents are liquids at a temperature of about 25° C. Particularly preferred solvents may be characterized by a relatively high dielectric constant. Without limitation, exemplary solvents may have a dielectric constant greater than about 15, preferably greater than 27, more preferably greater than 50 and most preferably greater than about 66. Dielectric constants may be measured for example using the methodology of ASTM D150.

In one aspect of the invention, the solvent includes a solvent that is characterized as a compound having mono-hydroxy-terminated ethylene oxide-based ligands, an organophosphate, or both. For example, the solvent is an organophosphate solvent having mono-hydroxy-terminated ethylene oxide-based ligands. The solvent preferably includes, or consists essentially of an aprotic solvent, which may be anhydrous. By "anhydrous" it is meant that the solvent as well as the electrolyte composition material comprises water at a concentration of about 1,000 ppm (parts per million by weight) or less, preferably about 500 ppm or less, and more preferably about 100 ppm or less. Preferred aprotic solvents for forming the binder material comprise at least one member selected from the group consisting of organic aprotic carriers or solvents, organic sulfites, organic sulfones, organic carbonates, organic esters, organic ethers, their fluorinated derivatives, and any combination thereof. Preferred organic esters include lactones and acetates.

The solvent preferably is an organic solvent. A preferred solvent includes or consists essentially of one or more cyclic carbonates, one or more acyclic carbonates, or one more fluorine containing carbonates, one or more cyclic esters, or any combination thereof. Acyclic carbonates include linear acyclic carbonates. Without limitation, examples of solvent may include cyclic carbonates, preferably including ethylene carbonate (EC), propylene carbonate (PC), fluoroethylene carbonate (FEC), and butylene carbonate (BC). Additional examples may include a cyclic carbonate having a C═C unsaturated bond, such as vinylene carbonate (VC), vinylethylene carbonate (VEC), divinylethylene carbonate, phenylethylene carbonate, diphenyethylene carbonate, or any combination thereof.

Examples of linear acyclic carbonates such as dimethyl carbonate (DMC), ethylmethyl carbonate (EMC), diethyl carbonate (DEC), dipropyl carbonate (DPC), methylpropyl carbonate (MPC), ethyl propyl carbonate (EPC), and methylbutyl carbonate may also be used alone or in combination. Examples of a linear carbonate having a C═C unsaturated bond include methyl vinyl carbonate, ethyl vinyl carbonate, divinyl carbonate, allyl methyl carbonate, allyl ethyl carbonate, diallyl carbonate, allyl phenyl carbonate, diphenyl carbonate, or any combination thereof.

Other carbonates which may be used include fluorine containing carbonates, including difluoroethylene carbonate (DFEC), bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, or any combination thereof.

Exemplary cyclic esters include γ-butyrolactone (γ-BL), α-methyl-γ-butyrolactone, γ-valerolactone; or any combination thereof. Examples of a cyclic ester having a C═C unsaturated bond include furanone, 3-methyl-2(5H)-furanone, α-angelicalactone, or any combinations thereof.

Other solvents which may be used include fluorinated oligomers, dimethoxyethane, triethylene glycol dimethyl ether (i.e., triglyme), tetraethyleneglycol, dimethyl ether (DME), polyethylene glycols, bromo γ-butyrolactone, fluoro chloroethylene carbonate, ethylene sulfite, propylene sulfite, phenylvinylene carbonate, catechol carbonate, vinyl acetate, dimethyl sulfite, or any combination thereof. Among these solvents, EC, PC and γ-BL are preferred, and PC is most preferred. The concentration of the carbonate solvent (e.g., the concentration of EC, PC, γ-BL, or any combination thereof) preferably is about 50 weight percent or more, more preferably about 75 weight percent or more, even more preferably about 90 weight percent or more, and most preferably about 95 weight percent or more, based on the total weight of the organic solvent.

The solvent may include, consist substantially of (e.g., at least about 95 weight percent based on the total weight of the solvent), or even consist of one or more solvents that are characterized as a compound having mono-hydroxy-terminated ethylene oxide-based ligands, an organophosphate, or both. For example, the solvent is an organophosphate solvent having mono-hydroxy-terminated ethylene oxide-based ligands. Without limitation, one exemplary organophosphate which may be used is O=P(OC$_2$H$_4$OC$_2$H$_4$OCH$_3$)$_3$. Analogues containing propylene oxide, a combination of propylene oxide and ethylene oxide, a monoethyl ether, a monobutyl ether, a monopropyl ether, from 3 to 5 alkoxide groups, or the like may also be used. One approach contemplates selecting and employing a solvent so that flame retardancy of the binder is managed. For example, it is possible to employ an organophosphate of a type an amount sufficient to improve the flame retardant characteristics of the electrolyte compared to a similarly prepared electrolyte in which the organophosphate is eliminated. An improvement in the flame retardant characteristics of the electrolyte may be characterized by a reduction in the horizontal burn rate (e.g., a reduction of at least 20 percent) as measured by ASTM D635; an increase in the oxygen index (e.g., an increase in the oxygen index by at least 1 percent on an absolute basis) as measured for example according to ASTM D2863; an increase in the flash point (e.g., an increase of about 10° C. or more, preferably an increase of about 20° C. or more) as measured by the Cleveland Open Cup method ASTM D92; or any combination thereof. By way of example the organophosphate may be O=P(OC$_2$H$_4$OC$_2$H$_4$OCH$_3$)$_3$. The organophosphate, if employed, should be used at a concentration sufficient to improve the flame retardant characteristics of the electrode or the electrolyte. If employed, the organophosphate preferably is present in an amount of about 1 weight percent or more, more preferably about 5 weight percent or more, even more preferably about 10 weight percent or more, even more preferably about 15 weight percent or more, and most preferably about 30 weight percent or more, based on the total weight of the electrode, or the polymeric electrolyte. If employed the organophosphate preferably is present in an amount of about 60 weight percent or less, preferably about 50 weight percent or less, and most preferably about 40 weight percent or less, based on the total weight of the electrode, or the polymeric electrolyte.

The binder composition (i.e., the binder material), the ethylene oxide-containing copolymer or both may be characterized by a relatively low glass transition temperature. For example, the glass transition temperature may be less than about −30° C., preferably less than about −40° C., more preferably less than about −50° C., even more preferably less than about −55° C., and most preferably less than about −60° C. The binder composition may be substantially entirely or even completely amorphous at about 50° C. or even at room temperature (e.g., about 23° C.). Preferably the ethylene oxide-containing copolymer has a low melting temperature such that the melting temperature of the binder composition is less than about 50° C., preferably less than 35° C., more preferably less than bout 23° C., and most preferably less than about 15° C.

Electroactive Particles

The electroactive particles may be any size or shape so that a composite electrode can be formed. The electroactive particles preferably have a particle size (e.g., a median diameter, a mean diameter, a median length, a mean length, a top particle diameter, a top particle length, or any combination thereof) of about 100 μm or less, more preferably about 10 μm or less, even more preferably about 3 μm or less, and most preferably about 1 μm or less. The electroactive particles preferably have a particle size (e.g., a median diameter, a mean diameter, a median length, a mean length, a top particle diameter, a top particle length, or any combination thereof) of about 0.01 μm or more, more preferably about 0.05 μm or more.

The electroactive particles may have overlapping conduction bands and valence bands. For example, the electroactive particle may include a metal, a metal alloy, a metal oxide, or any combination thereof. Preferably, the electroactive particle may include V, Fe, Mn, Co, Ni, Ti, Zr, Ru, Re, Pt, Li, or any combination thereof. Preferably the EAP includes an oxide containing one, two, three, four, or more metals. Without limitation, exemplary EAPs, may include lithium. More preferably, the EAP may include Li, O, and another metal selected from Ni, Co, Mn, Ti, or any combination thereof. A plurality of electroactive particles may include a plurality of particles of a single chemical structure (e.g., a single metal, a single metal alloy, or a single metal oxide) or may include particles having different chemical structures (e.g., two or more different metal containing particles). Uncoated or coated particles may be used in the composite electrode. Preferred EAPs are uncoated particles.

The binder material, the composite electrode, or both may be prepared by a process including a step of mixing the ethylene oxide-containing copolymer, the particles (e.g., the EAPs), the metal salt, the solvent, or any combination thereof, to form a generally homogeneous mixture. The mixing may be at a compounding temperature above the melting temperature of the ethylene oxide-containing copolymer. The process may also include a step of forming (preferably into a non-porous film, sheet, or tape) the binder material or the electrode, e.g., by extruding, molding, milling or calandering. The binder material may be formed into pellets (e.g., having a mass less than about 0.2 g) or any other shape suitable for further processing, such as an additional mixing step of mixing the binder material with particles (e.g., EAPs). The binder materials and electrodes may also be prepared by contacting the polymer of the binder material (e.g., a mixture of the polymer and the EAPs) with the solvent or with a solvent mixture of the solvent and the metal salt. Thus, the process may include a step of swelling the polymer with the solvent or solvent mixture. The swelling step may occur prior to forming the binder material or the composite electrode, or after the forming step. For example, the swelling step may occur after assembling a battery that includes the ethylene oxide-containing copolymer. The formed binder material may be a solid polymer electrolyte.

Tensile Properties of the Composite Electrode

The composite electrode of the present invention has a surprisingly high strength and durability, rendering them satisfactory to be used in a secondary battery which undergoes mechanical stresses induced from electrical cycling without loss of interfacial strength between the EAPs and the binder material. For example the composite electrodes may have tensile properties (as measured according to ASTM D882-97, using sample type ASTM D638-03 IV) such that the elongation at failure is greater than about 6 percent, preferably greater than about 8 percent, more preferably greater than about 10 percent, even more preferably greater than about 12 percent, and most preferably greater than about 14 percent. Such composite electrodes may maintain interfacial contact between the EAPs and the binder material. By way of example, less than 10 percent, preferably less than about 5 percent or even less than 1 percent of the EAPs pull out of the binder material after a strain of about 2 percent, or even after a strain of about 10 percent as observed using scanning electron microscopy on samples tested according to ASTM D882-97, using sample type ASTM D638-03 IV. The stress-strain curve may be free of a kink (e.g., free of an infection point and free of a maximum) at all strains less than about 1.5 percent, preferably at all strains less than about 2 percent, and most preferably at all strains less than about 3 percent.

The binder materials (e.g., the solid polymer electrolytes) described herein may be used in a secondary battery (e.g., an anhydrous secondary battery, such as a lithium battery, or in an aqueous battery, such as a Ni-metal hydride, a zinc/air, a lithium/air or carbon/zinc battery), a fuel cell (e.g., a cell in which the conductor is protons), a photovoltaic cell (e.g., a Graetzel cell), electrochemical devices, and sensor devices.

Electrical Properties of the Binder Composition

The binder compositions prepared using the ethylene oxide-containing copolymers of the present invention may have an ionic conductivity (e.g., at a temperature of about 60° C.) that is greater than the ionic conductivity of an identically prepared binder composition in which the ethylene oxide-containing copolymer is replaced with an ethylene oxide homopolymer. Electrical conductivity (e.g., ionic conductivity) may be measured using AC Impedence spectroscopy as described in the "Test Methods" section below. Without being bound by theory, the increased ionic conductivity is believed to be a result of the lower melting temperature of the random copolymer. Binder compositions including a metal salt (e.g., a metal salt or lithium salt present at an O:M ratio or O:Li ratio from about 2 to about 30, preferably from about 4 to about 20) and an ethylene-oxide containing copolymer described herein preferably have an electrical conductivity (e.g., ionic conductivity) measured at 60° C. that is at least twice, preferably at least three times, more preferably at least four times, and most preferably at least 5 times the electrical conductivity of an identically prepared binder composition in which the ethylene oxide-containing copolymer is replaced with an ethylene oxide homopolymer.

Test Methods

Melting temperature (i.e., peak melting temperature, $T_p$), final melting temperature ($T_f$), and heat of fusion ($H_f$) may be measured using differential scanning calorimetry. Differential scanning calorimetry (DSC) is performed using 1-3 mg of polymer in a sealed pan, under helium flow, on a TA Instruments DSC 2920. The samples are cooled to −120° C., then heated to 120° C. at a rate of 10° C./min, followed by re-cooling to −120° C. and reheating to 120° C., both at a rate of 10° C./min. The peak melting temperature, melting temperature and heat of fusion are measured on the second heating. The crystallinity, Xc, is calculated by dividing $H_f$ by the heat of the theoretical heat of fusion, $H_t$, for the polymer (i.e., the polyethylene oxide homopolymer) having 100 percent crystallinity and multiplying by 100 percent:

$$Xc = 100\ \text{percent} \times (H_f/H_t)$$

where $H_t$=188 J/g and the theoretical $T_f$ for a perfect crystal is 66° C. for polyethylene oxide homopolymer (see e.g., F. Rodriguez, *Principles of Polymer Science*, $2^{nd}$ Edition, Hemisphere Publishing Co., 1982, p. 54).

Sequence distribution of the ethylene oxide and the second monomer in the ethylene oxide copolymer may be measured using $^{13}C$ NMR. The sequence distribution may be used to calculate the blockiness index.

The blockiness index (BI) of the copolymer is defined for an Y—Z copolymer as:

$$BI = (f(YZ) + f(ZY))/(2x_Y x_Z)$$

where $f(YZ) + f(ZY)$ is the sum of the YZ and ZY diad fractions; and $x_Y$ and $x_Z$ are the mole fraction of monomer Y and monomer Z, respectively. An alternating polymer has BI=1/$(1-x_Z)$ where Z is the minority monomer (i.e., $x_Z \leq 0.5$), and for the special case of $x_Y = x_Z = 0.5$, BI is 2. For a perfect block copolymer (e.g., a diblock copolymer), BI about 0.

The ethylene oxide and propylene oxide concentrations may be measured using $^1H$ NMR. NMR measurement may be done on a Bruker AMX-300 operating at 300 MHz. The intensity of the NMR peaks originating from hydrogen atoms on the backbone of the chain, $I_{backbone}$, is determined by integrating the NMR spectrum from about 3.78 to about 3.30 ppm. The intensity of the NMR peaks origination from hydrogen atoms on the pendant methyl group, $I_{methyl}$, is determined by integrating the NMR spectrum from about 1.18 to about 1.13 ppm. The concentration of propylene oxide is given by:

$$\text{percent PO} = 100\ \text{percent}(I_{methyl}/3)/((I_{methyl}/3) + (I_{backbone}/4) - (I_{methyl}/4))$$

For example, in the case where $I_{backbone}=400$ and $I_{methyl}=31.36$, the percentPO=10.18 mole percent.

GPC—Molecular Weight Distribution

The molecular weight (including the number average molecular weight and weight average molecular weight, and the polydispersity index of the ethylene oxide-containing copolymer may be measured by gel permeation chromatography (GPC) using a Polymer Liquids PL Aquagel-OH, 15 μm column. The mobile phase is an aqueous solution of about 0.05 percent $NaN_3$ and a flow rate of about 0.8 mL/min is used. The injection size is about 200 μL. A Waters 590 HPLC isocratic pump and a Waters 717Plus autosampler are used. The measurement system is a dual detection system including a Wyatt Technology Dawn DSP Laser Photometer and a Waters 2410 refractive index detector. The results are analyzed and interpreted using WTC-Astra 4.72 software.

Electrical Conductivity/Ionic Conductivity

The conductivity of the polymeric binder compositions may be measured using AC impedance spectroscopy in a Solartron using an alternating current (AC) amplitude of about 10 mV. Details of the AC impedance spectroscopy method are in *Handbook of Batteries*, 3rd Ed; David Linden and Thomas Reddy, Editors, McGraw-Hill, 2001, New York, N.Y., pp. 2.26-2.29, incorporated herein by reference.

Shear Modulus

The shear modulus, the loss modulus, and the tan delta of the polymers and of the polymeric electrolyte compositions may be measured using dynamic mechanical analysis (e.g., according to ASTM D5279-08). Unless otherwise specified shear modulus is measured at a temperature of about 30° C. and a oscillatory shear frequency of about 1 radian/sec at a strain of typically about 0.04 percent.

EXAMPLES

Example EP-1

Example EP-1 is an ethylene oxide-containing random copolymer prepared using a slurry polymerization process. A pressure-rated reactor with a steel agitator is purged with nitrogen at about 75° C. for about four hours. The reactor is cooled to about 32° C., and charged with about 420 g dry isopentane, about 3.0 g Cabot SpectrAL 51 alumina in 60 g hexane, about 1.7 g propylene oxide. About 6.6 mL of a 1 mole/L solution of triisobutylaluminum in hexane is then injected into the reactor using a syringe. Next, 0.22 g of triethylamine is added. The molar ratio of aluminum to nitrogen atoms (Al:N) is about 3. Ethylene oxide and propylene oxide are then fed at a rate of about 26.4 g/h and about 2.6 g/h respectively. A reaction temperature of about 32° C., and a reaction pressure of about 7-10 psi is maintained. After feeding about 100 g of ethylene oxide, the reaction is terminated by adding about 1.6 g 2-propanol using a syringe and continuing to stir the reaction for about 0.5 hours. The mixture is then cooled to room temperature (about 23° C.) and the contents is removed, filtered, washed with hexane and dried in a vacuum oven overnight at room temperature. The polymer is stabilized with about 1000 g of 2,6-di-t-butyl-4-methylphenol (BHT). The polymer is a white powder and the yield is about 79.6 g. The reduced viscosity of a 0.2 weight percent aqueous solution of the polymer, as measured using capillary rheometry, is about 0.50. The molecular weight distribution is measured using gel permeation chromatography (GPC). The weight average molecular weight, Mw, and number average molecular weight, Mn, are about 76,000 and 72,000 respectively, and the polydispersity index is about 1.06. The melting temperature of the polymer is determined on a 1-3 milligram sample using differential scanning calorimetry by heating the polymer to the 100° C., cooling at 10° C./min to −30° C. and then reheating at 10° C./min to 100° C. The melting temperature, measured on the second heating is about 46.4° C. The ethylene oxide and propylene oxide concentrations and the sequence distribution are measured using NMR techniques. The propylene oxide concentration in the polymer is about 4.5 mole percent. The reaction conditions for Example EP-1 are given in TABLE 1 and properties are given in TABLE 2.

TABLE 1

| Example | EP-1 | EP-2 | EP-3 | EP-4 | EP-5 | EP-6 |
| --- | --- | --- | --- | --- | --- | --- |
| Reaction Temperature, ° C. | 32 | 32 | 32 | 32 | 38.5 | 38.5 |
| Reaction Pressure, psi | 7-10 | 7-10 | 7-10 | 7-10 | 7-10 | 7-10 |
| Charging | | | | | | |
| Isopentane, g | 420 | 420 | 420 | 420 | 420 | 420 |
| Cabot SpectrAL alumina (5 g/100 g hexane), g | 60 | | 60 | | 60 | |
| Hydrophobic silica (Cabot TS-720), g | | | | | | 3.3 |
| Degussa aluminum oxide C, (5 g/100 g hexane), g | | 21 | | | | |
| Silica (Degussa R-202), g | | | | 3 | | |
| Triisobutylaluminum in hexane (1.0 mol/L), mL | 6.6 | 6.6 | 6.6 | 6.6 | 6.6 | 6.6 |
| Triethylamine, g | 0.22 | 0.22 | 0.11 | 0.11 | 0.22 | 0.22 |
| Propylene oxide, g | 1.7 | 1.7 | 3.3 | 3.3 | 1.7 | 1.7 |
| Feed rates: | | | | | | |
| Propylene oxide, g/h | 2.6 | 2.6 | 2.6 | 2.3 | 2.6 | 2.6 |
| Ethylene oxide, g/h | 26.4 | 26.4 | 26.4 | 19.8 | 26.4 | 26.4 |
| Total Feed: | | | | | | |
| Propylene oxide, g | 10 | 10 | 10 | 11.6 | 6.5 | 10 |
| Ethylene oxide, g | 100 | 100 | 100 | 100 | 70.1 | 100 |
| Termination | | | | | | |
| 2-propanol, g | 1.6 | 1.6 | 1.6 | 1.6 | 1.6 | 1.6 |
| 2,6-Di-t-butyl-4-methylphenol (BHT), ppm | 1000 | 1000 | 1000 | 1000 | 1000 | 1000 |

Example EP-2

Example EP-2 is prepared in the same manner as Example EP-1 except the 1 g of Degussa Aluminum Oxide C in 20 g hexane is added instead of the Cabot SpectrAL 51 alumina used in EP-1. The reaction conditions for Example EP-2 are given in TABLE 1 and properties are given in TABLE 2.

Example EP-3

Example EP-3 is prepared in the same manner as Example EP-1 except the triethylamine is reduced to about 0.11 g and the propylene oxide pre-charge is increased to about 3.3 g. The reaction conditions for Example EP-3 are given in TABLE 1 and properties are given in TABLE 2.

TABLE 2

| | EP-1 | EP-2 | EP-3 | EP-4 | EP-5 | EP-6 |
| --- | --- | --- | --- | --- | --- | --- |
| Yield, g | 79.6 | 84 | 86 | 80 | 68 | 119 |
| $M_w$, Daltons | 76000 | 82000 | 82000 | 98000 | 19000 | 122000 |
| $M_n$, Daltons | 72000 | 79000 | 79000 | 86000 | | 35000 |
| $M_w/M_n$ | 1.06 | 1.04 | 1.04 | 1.14 | 1.04 | 3.5 |
| Melting Temperature, ° C. | 46.4 | 45.4 | 44.1 | 44.1 | 39.3 | 44.7 |
| Propylene oxide, mole % | 4.5 | 5.2 | 5.6 | 4.8 | | |
| Ethylene oxide, mole % | 95.5 | 94.8 | 94.4 | 95.2 | | |
| Reduced viscosity (0.2 wt % aqueous solution) | 0.50 | 0.74 | 0.62 | 0.88 | | |

Example EP-4

Example EP-4 is prepared in the same manner as Example EP-3, except about 3 g of AEROSIL® R 202 fumed silica treated with polydimethylsiloxane available from Degussa is used, and the feed rates of the ethylene oxide and the propylene oxide are reduced to about 19.8 g/h and about 2.3 g/h respectively. The fumed silica has a BET Surface area from about 80 to about 120 $m^2/g$, a pH from about 4.0 to about 6.0, and a carbon concentration from about 3.5 to about 5.0 weight percent. The reaction conditions for EP-4 are given in TABLE 1 and properties are given in TABLE 2.

Example EP-5

Example EP-5 is prepared in the same manner as Example EP-1, except the reaction temperature is increased to about 38.5° C. The reaction is terminated early (after about 2.5 hours) after charging about 70.1 g ethylene oxide and about 6.5 g propylene oxide, due to massive fouling on the reactor wall and bottom. No granular or powdery product is recovered. The product is a wax-like material and is formed as a thick layer on the reactor wall, reactor bottom, and agitator. The layer can be peeled away easily. The reaction conditions for Example EP-5 are given in TABLE 1 and properties are given in TABLE 2.

Example EP-6

Example EP-6 is prepared in the same manner as Example EP-1, except the reaction temperature is increased to about 38.5° C. and 3.3 g of a hydrophobic silica (TS-720 available from Cabot Corporation) is used in place of the alumina. The reaction conditions for EP-6 are given in TABLE 1 and properties are given in TABLE 2. The polydispersity (about 3.5) is much higher than Examples EP-1, EP-2, EP-3, EP-4, and EP-5.

Examples EP-7, EP-8, EP-9, and EP-10

Examples EP-7, EP-8, and EP-9 are copolymers of ethylene oxide an propylene oxide prepared by slurry polymerization at a temperature of about 40° C. using a calcium containing catalyst. The copolymers have a weight average molecular weight greater than 1,000,000 Daltons, a polydispersity index of at least about 3 and are insoluble in water at a concentration of 0.2 weight percent. The peak melting temperatures of Examples EP-7, EP-8 and EP-9 are 51.3° C., 51.0° C., and 50.0° C., respectively. The molar concentration of propylene oxide in Examples EP-7, EP-8, and EP-9 are 12.7 percent, 14.4 percent, and 10.2 percent, respectively.

The copolymers prepared using an aluminum catalyst are expected to have lower melting temperatures (at the same or lower comonomer concentration), lower molecular weights, lower polydispersity, and are more soluble in water than the copolymers prepared using a calcium catalyst.

Example EP-10 is prepared by irradiating Example EP-7 to reduce the molecular weight. Example EP-10 has a molecular weight less than about 300,000 Daltons, a polydispersity of about 2, a peak melting temperature of a about 51.1° C., and a propylene oxide concentration of about 12.6 mole percent. Example EP-10 is insoluble in water at a concentration of about 0.2 weight percent.

Example EP-11 (EP-11)

Example EP-11 is a random copolymer of 95.3 mole percent ethylene oxide and 4.7 mole percent propylene oxide prepared using a process similar to Example EP-1 with appropriate changes to increase the molecular weight. Example EP-11 is characterized by: a weight average molecular weight of Example EP-11 of about 118,000, a polydispersity index less than about 1.10, a glass transition temperature of about −60° C. as measured by differential scanning calorimetry and about −54° C. as measured by dynamic mechanical analysis, a melting temperature of about 49° C., a crystallinity of about 47 weight percent, a shear modulus of about 122 MPa at 30° C., an elastic modulus of about 250 MPa, and a crystallite size of about 114 μm.

Example EP-12 (EP-12)

Example EP-12 is a random copolymer of about 90 mole percent ethylene oxide and about 10 mole percent propylene oxide prepared using a calcium containing catalyst. Example EP-12 which is then irradiated to reduce the molecular weight. Example EP-12 is characterized by: a weight average molecular weight of about 84,100 and a number average molecular weight of about 26,400 Daltons, a polydispersity index of about 3.18, a glass transition temperature of about −65° C. as measured by differential scanning calorimetry and about −57° C. as measured by dynamic mechanical analysis, a melting temperature of about 47° C., a crystallinity of about 24 weight percent, a shear modulus of about 16 MPa at 30° C., an elastic modulus of about 22 MPa, and a crystallite size of about 344 μm.

Example EP-13 (EP-13)

Example EP-13 is a random copolymer of about 92 mole percent ethylene oxide and about 8 mole percent propylene oxide prepared using triisobutylaluminum catalyst and silica. The silica is Cab-o-Sil® TS-720 available from Cabot Corporation. Example EP-13 is characterized by: weight average molecular weight of about 114,610 Daltons and a number average molecular weight of about 18,530 Daltons, a polydispersity index of about 6.19, a glass transition temperature of about −64° C. as measured by differential scanning calorimetry and about −55° C. as measured by dynamic mechanical analysis, a melting temperature of about 50° C., a crystallinity of about 47 weight percent, a shear modulus of about 55 MPa at 30° C., an elastic modulus of about 180 MPa, and a crystallite size of about 220 μm.

Experimental—Cathode Composites

Cathode Composite 1 (CC-1)

Figure 1B:
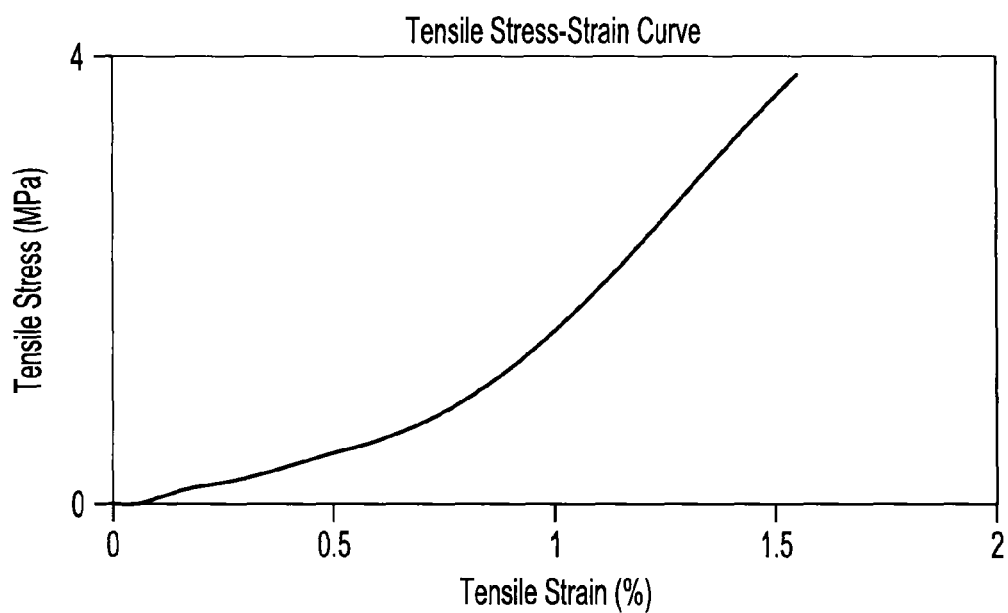
FIG. 1B depicts a region of the tensile stress versus tensile strain curve of FIG. 1A from a strain of about 0 to about 1.5 percent.

A cathode composite (CC-1) is prepared by mixing a binder material consisting of Example EP-11 random copolymer with $LiCoO_2$ particles (L056 available from LICO Technology Corporation) at a ratio of about 30 weight percent binder and 70 weight percent $LiCoO_2$ particles. The materials are mixed on a Haake mixer at 90° C. The tensile properties of CC-1 are measured according to ASTM D882-97, using sample type D638-03 IV. The tensile stress (MPa) vs. tensile strain (percent) is show in FIG. 1A and the region of this curve from 0 to 1.5 percent strain is shown in FIG. 1B. FIG. 1A shows that the tensile strain at failure of CC-1 is greater than about 12 percent (e.g., about 15 percent). FIGS. 1A and 1B shows that CC-1 does not yield at strains under about 3 percent (e.g., strains under about 1.5 percent). CC-1 is deforms in a ductile fashion. FIG. 2 is a scanning electron microscope micrograph of a tensile fractured surface of CC-1 showing the ductile failure. There is no evidence of particle pull-out from the EP-11 random copolymer matrix in FIG. 2.

CC-1 has an elastic modulus of about 500 MPa and a strain at failure of about 15 percent.

Comparative Cathode Composite 2 (CC-2)

Figure 3:
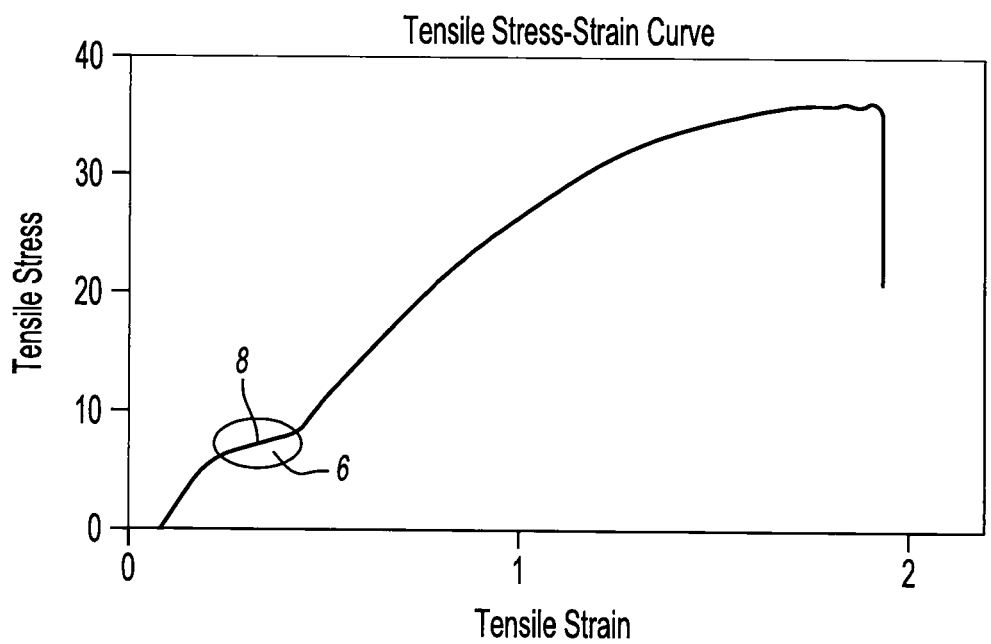
FIG. 3 illustrates a tensile stress (in units of MPa) vs. tensile strain (in units of percent) curve with the of a composite including PVDF and 70 percent electroactive particles.

A cathode composite (CC-2) is prepared similar to CC-1, except the random copolymer is replaced with a poly(vinylidene fluoride) (i.e., PVDF) polymer (Kynar® PowerFlex© available from Atofina). CC-2 is mixed in a Haake mixer at a temperature of about 180° C. The tensile properties of CC-2 are measured according to ASTM D882-97, using sample type D638-03 IV. The tensile stress (MPa) vs. tensile strain (percent) is show in FIG. 3. FIG. 3 illustrates that CC-2 is very brittle and has a tensile strain at failure less than about 5 percent (e.g., about 2 percent). FIG. 3 illustrates that CC-2 has a "kink" (e.g., an inflection point) in the stress strain curve at a strains under about 2 percent (e.g., strains under about 1 percent). Scanning electron microscopy of CC-2 indicates that the kink in the stress-strain curve at about 0.5 percent strain corresponds to pull-out of particles from the binder matrix phase. CC-2 does not have good mechanical integrity. FIG. 4 is a scanning electron microscope micrograph of a tensile fractured surface of CC-2 showing particle pull-out from the PVDF matrix.

Cathode Composite 3 (CC-3)

CC-3 is prepared using EP-12 using the same process and concentration of $LiCoO_2$ as CC-1. The composite material is characterized by an elastic modulus of about 58 MPa and a strain at failure of about 8 percent.

CC-4 is prepared using EP-13 using the same process and concentration of $LiCoO_2$ as CC-1. The composite material is characterized by an elastic modulus of about 340 MPa and a strain at failure of about 4 percent.

Binder Compositions

Figure 5:
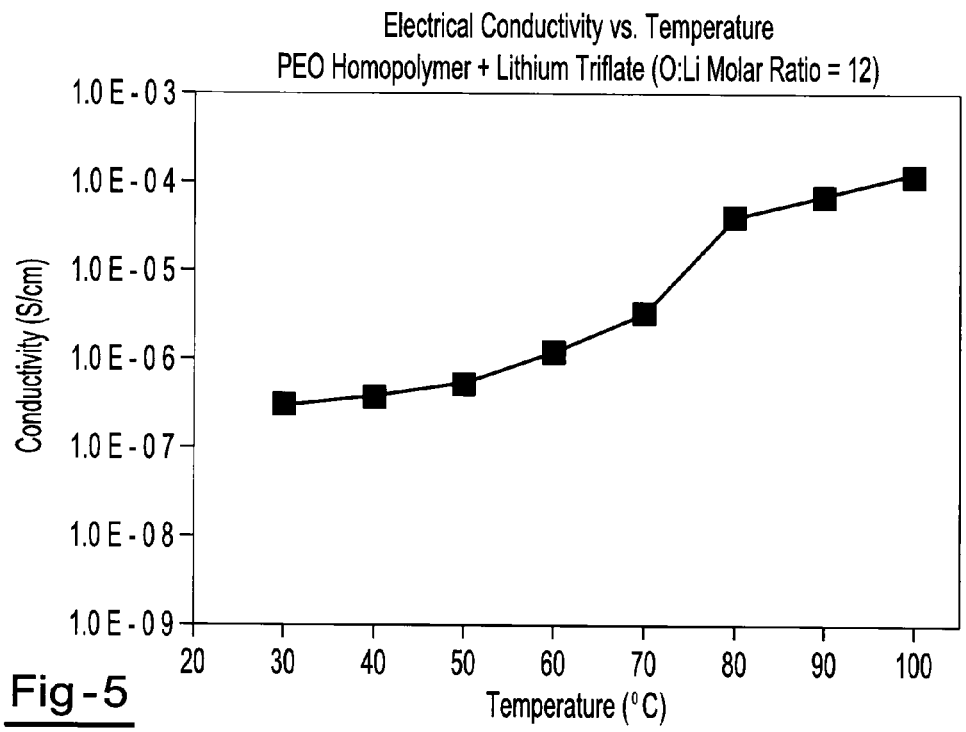
FIG. 5 is an illustrative conductivity versus temperature plot exoected for a binder composition including a metal salt and a polyethylene oxide homopolymer.

Binder compositions including a lithium salt are prepared by melt mixing the polymer and the salt. Comparative binder samples 1 (CBS-1) is prepared by mixing an ethylene oxide homopolymer having a weight average molecular weight of about 100,000 Da with lithium triflate at a molar ratio of oxygen (from the homopolymer) to lithium (from the salt) of about 12. The conductivity from about 30° C. to about 100° C. is measured using AC impedence spectroscopy as described above in the "Test Methods" section. The ionic conductivity of CBS1 as a function of temperature is shown in FIG. 5.

Figure 6:
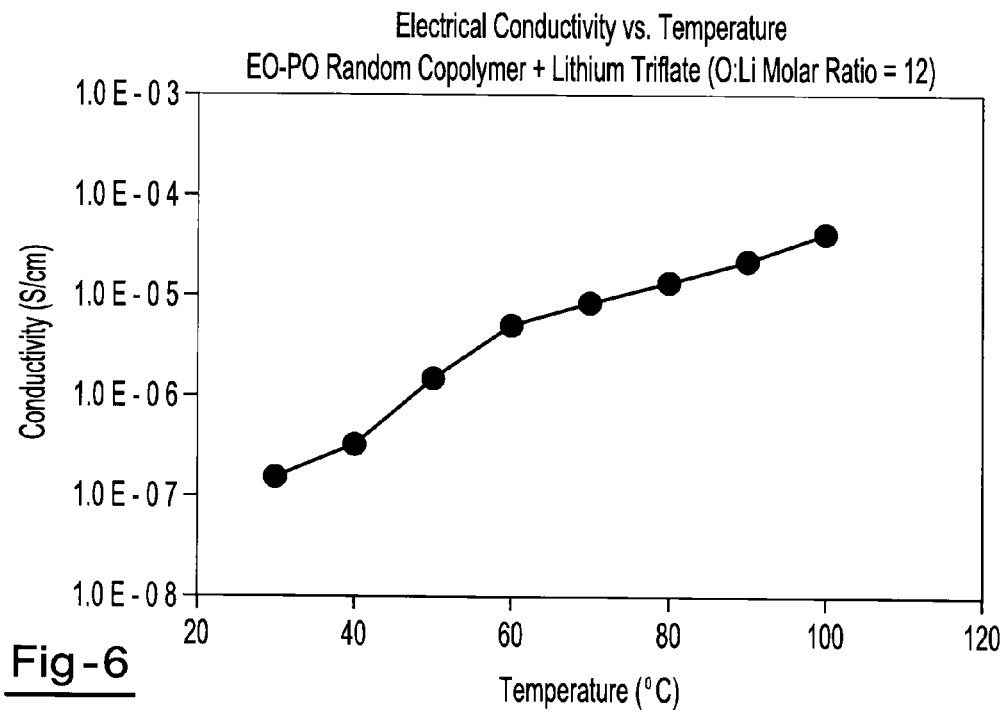
FIG. 6 is an illustrative conductivity versus temperature plot exoected for a binder composition including a metal salt and a random copolymer of ethylene oxide and propylene oxide.

Binder sample 2 (BS-2) is prepared by mixing a random copolymer of ethylene oxide and propylene oxide (Example EP-11) as described herein. The molar ratio of O:Li for BS-2 is about 12. The electric conductivity (e.g., ionic conductivity) of binder samples 2 is measured from about 30° C. to about 100° C. The electrical conductivity (e.g., ionic conductivity) of BS-2 is shown in FIG. 6.

The binder sample containing the random EO-PO copolymer (ES 2) has a higher electrical conductivity (e.g., ionic conductivity) at temperatures from about 50° C. through about 70° C. For example, at about 60° C., the electrical conductivity of BS-2 is at least 5 times the electrical conductivity of CBS-1.

As illustrated by the electrical conductivity (e.g., ionic conductivity) results of these samples, binder compositions (e.g., having an O:Li ratio from about 4 to about 30) including an ethylene-oxide containing copolymer described herein may have an electrical conductivity (e.g., ionic conductivity) at 60° C. (as measured by AC Impedence Spectroscopy) that is at least twice, preferably at least three times, more preferably at least four times, and most preferably at least 5 times the electrical conductivity of an identically prepared binder composition containing an ethylene oxide homopolymer instead of the ethylene-oxide containing copolymer.

The following discussion applies to the teachings as a whole. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. References to the term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. Likewise, any reference to "first" or "second" items is not intended to foreclose additional items (e.g., third, fourth, or more items); such additional items are also contemplated, unless otherwise stated. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It is understood that the above description is intended to be illustrative and not restrictive. Many embodiments as well as many applications besides the examples provided will be apparent to those of skill in the art upon reading the above description. It is further intended that any combination of the features of different aspects or embodiments of the invention may be combined. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A composition comprising:
   a. an ethylene oxide-containing copolymer including:
      i. a first monomer of ethylene oxide; and
      ii. at least one additional monomer selected from an alkylene-oxide that is different from the first monomer of ethylene oxide, an alkyl glycidyl ether, an allyl glycidyl ether, or a combination thereof; and
   b. a metal salt;
   wherein the ethylene oxide-containing copolymer has a weight average molecular weight less than about 200,000 g/mole,
   the ethylene oxide-containing copolymer is a random copolymer having a polydispersity index, $M_w/M_n$, less than 1.3,
   the ethylene oxide-containing copolymer has a molar fraction of the first monomer of ethylene oxide, $X_{EO}$, from about 0.80 to about 0.995, and
   the ethylene oxide-containing copolymer has a peak melting temperature, $T_p$, in units of °C., for a selected $X_{EO}$ in the range of about 0.80 to about 0.995, which is below a maximum value of $T_{pmax}$, at the selected $X_{EO}$, which is calculated using the equation $T_{pmax}=(60-280(1-X_{EO}))$.

2. The composition of claim 1 wherein the at least one additional monomer includes at least 90 mole percent propylene oxide, based on the total number of moles of the at least one additional monomer.

3. The composition of claim 1, wherein the at least one additional monomer includes a propylene oxide and the total concentration of the ethylene oxide and the propylene oxide is about 96 wt. % or more, based on the total weight of the ethylene oxide-containing copolymer.

4. The composition of claim 1 wherein the ethylene oxide-containing copolymer is a random copolymer consisting of ethylene oxide and propylene oxide.

5. The composition of claim 1, wherein the at least one additional monomer includes a propylene oxide.

6. The composition of claim 1 wherein the ethylene oxide-containing copolymer has
   i) a glass transition temperature less than about −30° C.;
   ii) a crystallinity less than about 40 weight percent; or
   iii) both (i) and (ii);
the ethylene oxide-containing copolymer is a copolymer consisting of ethylene oxide and one or more additional alkylene oxides; and
the ethylene oxide-containing copolymer has a weight average molecular weight less than 100,000 g/mole.

7. The composition of claim 6, wherein the ethylene oxide-containing copolymer has a blockiness index greater than about 0.75.

8. The composition of claim 1, wherein the at least one additional monomer includes a propylene oxide, the molar fraction of the first monomer, $X_{EO}$, is at least 0.90, and the total concentration of the ethylene oxide and the propylene oxide is 96 wt. % or more, based on the total weight of the ethylene oxide-containing copolymer.

9. The composition of claim 8, wherein the ethylene oxide-containing copolymer has a blockiness index greater than about 0.75.

10. A composition comprising:
a. an ethylene oxide-containing copolymer including:
   i. a first monomer of ethylene oxide; and
   ii. at least one additional monomer selected from an alkylene-oxide that is different from the first monomer of ethylene oxide, an alkyl glycidyl ether, an allyl glycidyl ether, or a combination thereof; and
b. a metal salt;
wherein the ethylene oxide-containing copolymer has a weight average molecular weight less than about 200,000 g/mole,
the ethylene oxide-containing copolymer a random copolymer having polydispersity index, $M_w/M_n$, less than about 3,
the ethylene oxide-containing copolymer has a molar fraction of the first monomer of ethylene oxide, $X_{EO}$, greater than 0.88 to about 0.995, and,
the ethylene oxide-containing copolymer has a peak melting temperature, $T_p$, in units of ° C., for a selected $X_{EO}$ in the range of 0.88 to about 0.995, which is below a maximum value of $T_{pmax}$, at the selected $X_{EO}$, which is calculated using the equation $T_{pmax}=(60-150(1-X_{EO}))$;
wherein the ethylene oxide-containing copolymer has a blockiness index greater than about 0.75.

11. A composite electrode comprising the composition of claim 10, wherein the composite electrode includes a plurality of electroactive particle, and the ethylene oxide-containing copolymer is in contact with the electroactive particles.

12. The composition of claim 10, wherein $T_{pmax}=(60-280(1-X_{EO}))$.

13. The composition of claim 12, wherein the at least one additional monomer includes a propylene oxide, the molar fraction of the first monomer of ethylene oxide, $X_{EO}$, is at least 0.90, the ethylene oxide-containing copolymer is a random copolymer having a polydispersity index less than 1.30, and the total concentration of the ethylene oxide and the propylene oxide is 96 wt. % or more, based on the total weight of the ethylene oxide-containing copolymer.

14. A composite electrode comprising the composition of claim 1, wherein the composite electrode includes a plurality of electroactive particle, and the ethylene oxide-containing copolymer is in contact with the electroactive particles.

15. The composite electrode of claim 14, wherein the electroactive particles have an average diameter from about 10 nm to about 20 μm, and the concentration of the electroactive particles is from about 20 weight percent to about 95 weight percent, based on the total weight of the composite electrode; the composition includes a metal salt selected from the group consisting of one or more alkali metal salt, one or more alkaline earth metal salt, and any combination thereof.

16. The composite electrode of claim 14, wherein
i) the stress vs. strain curve of the composite electrode is free of a peak or inflection point between a strain of about 0 percent and about 2 percent as measured according to ASTM D882-97 using sample type D638-03 IV;
ii) the composite electrode has a tensile strain at failure greater than about percent, when tested according to ASTM D882-97; or
iii) both (i) and (ii).

17. The composite electrode of claim 14, wherein the composite electrode includes a lithium salt selected from the group consisting of lithium trifluoromethane sulfonate (i.e., lithium triflate or $LiCF_3SO_3$), lithium hexafluorophosphate (i.e., $LiPF_6$), lithium hexafluoroarsenate (i.e. $LiAsF_6$), lithium imide, lithium tris(trifluoromethane sulfonate) carbide (i.e., $Li(CF_3SO_2)_3C$), lithium tetrafluoroborate (i.e., $LiBF_4$), LiBF, LiBr, $LiC_6H_5SO_3$, $LiCH_3SO_3$, $LiSbF_6$, LiSCN, $LiNbF_6$, lithium perchlorate (i.e., $LiClO_4$), lithium aluminum chloride (i.e., $LiAlCl_4$), $LiB(CF_3)_4$, $LiBF(CF_3)_3$, $LiBF_2(CF_3)_2$, $LiBF_3(CF_3)$, $LiB(C_2F_5)_4$, $LiBF(C_2F_5)_3$, $LiBF_2(C_2F_5)_2$, $LiBF_3(C_2F_5)$, $LiB(CF_3SO_2)_4$, $LiBF(CF_3SO_2)_3$, $LiBF2(CF_3SO_2)_2$, $LiBF_3(CF_3SO_2)$, $LiB(C_2F_5SO_2)_4$, $LiBF(C_2F_5SO_2)_3$, $LiBF_2(C_2F_5SO_2)_2$, $LiBF_3(C_2F_5SO_2)$, $LiC_4F_9SO_3$, lithium trifluoromethanesulfonyl amide, or any combination thereof.

18. The composite electrode of claim 14, wherein the composite electrode further comprises a carbonate solvent.

19. A secondary battery prepared using a composite electrode of claim 14.

20. A process for polymerizing an ethylene oxide-containing copolymer comprising contacting a first monomer of ethylene oxide and at least one additional monomer with a catalyst in the presence of a hydrocarbon diluent; at a reaction temperature less than the melting temperature of the copolymer for reacting the monomers to polymerize the copolymer; wherein the at least one additional monomer is an alkylene-oxide that is different from the first monomer of ethylene oxide, an alkyl glycidyl ether, an allyl glycidyl ether, or a combination thereof;
wherein
the ethylene oxide-containing copolymer has a weight average molecular weight less than about 200,000 g/mole, the ethylene oxide-containing copolymer is a random copolymer having a polydispersity index, $M_w/M_n$, less than 1.3, the ethylene oxide-containing copolymer has a molar fraction of the first monomer of ethylene oxide, $X_{EO}$, from about 0.80 to about 0.995, and the ethylene oxide-containing copolymer has a peak melting temperature, $T_p$, in units of ° C., for a selected $X_{EO}$ in the range of about 0.80 to about 0.995, which is below a maximum value of $T_{pmax}$, at the selected $X_{EO}$, which is calculated using the equation $T_{pmax}=(60-280(1-X_{EO}))$.

* * * * *

UNITED STATES PATENT AND TRADEMARK OFFICE
CERTIFICATE OF CORRECTION

PATENT NO. : 9,056,944 B2
APPLICATION NO. : 13/201069
DATED : June 16, 2015
INVENTOR(S) : Susan J. Babinec et al.

It is certified that error appears in the above-identified patent and that said Letters Patent is hereby corrected as shown below:

In the Claims

In Column 27, line 24, the word "is" should be added after the word "copolymer".

In Column 28, line 11, the number "8" should be added before the word "percent".

Signed and Sealed this
Eighteenth Day of August, 2015

Michelle K. Lee
*Director of the United States Patent and Trademark Office*